United States Patent [19]

Mueller et al.

[11] Patent Number: 4,518,345

[45] Date of Patent: May 21, 1985

[54] DIRECT IGNITION GAS BURNER CONTROL SYSTEM

[75] Inventors: Carl J. Mueller, St. Louis County; John S. Haefner, Jefferson County, both of Mo.

[73] Assignee: Emerson Electric Co., St. Louis, Mo.

[21] Appl. No.: 470,309

[22] Filed: Feb. 28, 1983

[51] Int. Cl.³ ............................................. F23N 5/00
[52] U.S. Cl. .................................... 431/24; 431/18; 431/29; 431/66; 431/70
[58] Field of Search ................ 431/18, 24, 25, 27, 431/29, 66–73, 78, 80; 307/117; 340/577, 579; 361/264, 265, 266

[56] References Cited

U.S. PATENT DOCUMENTS

| 3,715,180 | 2/1973 | Cordell | 431/25 |
| 4,188,181 | 2/1980 | Rippelmeyer et al. | 431/66 |
| 4,211,526 | 7/1980 | Schilling | 431/66 X |
| 4,265,612 | 5/1981 | Romanelli et al. | 431/66 |
| 4,306,853 | 12/1981 | Rippelmeyer | 431/66 |
| 4,402,663 | 9/1983 | Romanelli et al. | 431/66 |
| 4,444,551 | 4/1984 | Mueller et al. | 431/25 |

Primary Examiner—Margaret A. Focarino
Attorney, Agent, or Firm—Paul A. Becker, Sr.

[57] ABSTRACT

A direct ignition gas burner control system includes an igniter, two serially-arranged gas valves for controlling the flow of gas to the burner, and a microcomputer and related circuitry for controlling energizing of the igniter and valves. The microcomputer and its related circuitry provide for numerous options in system functions and for numerous checks on the integrity of the system components.

11 Claims, 18 Drawing Figures

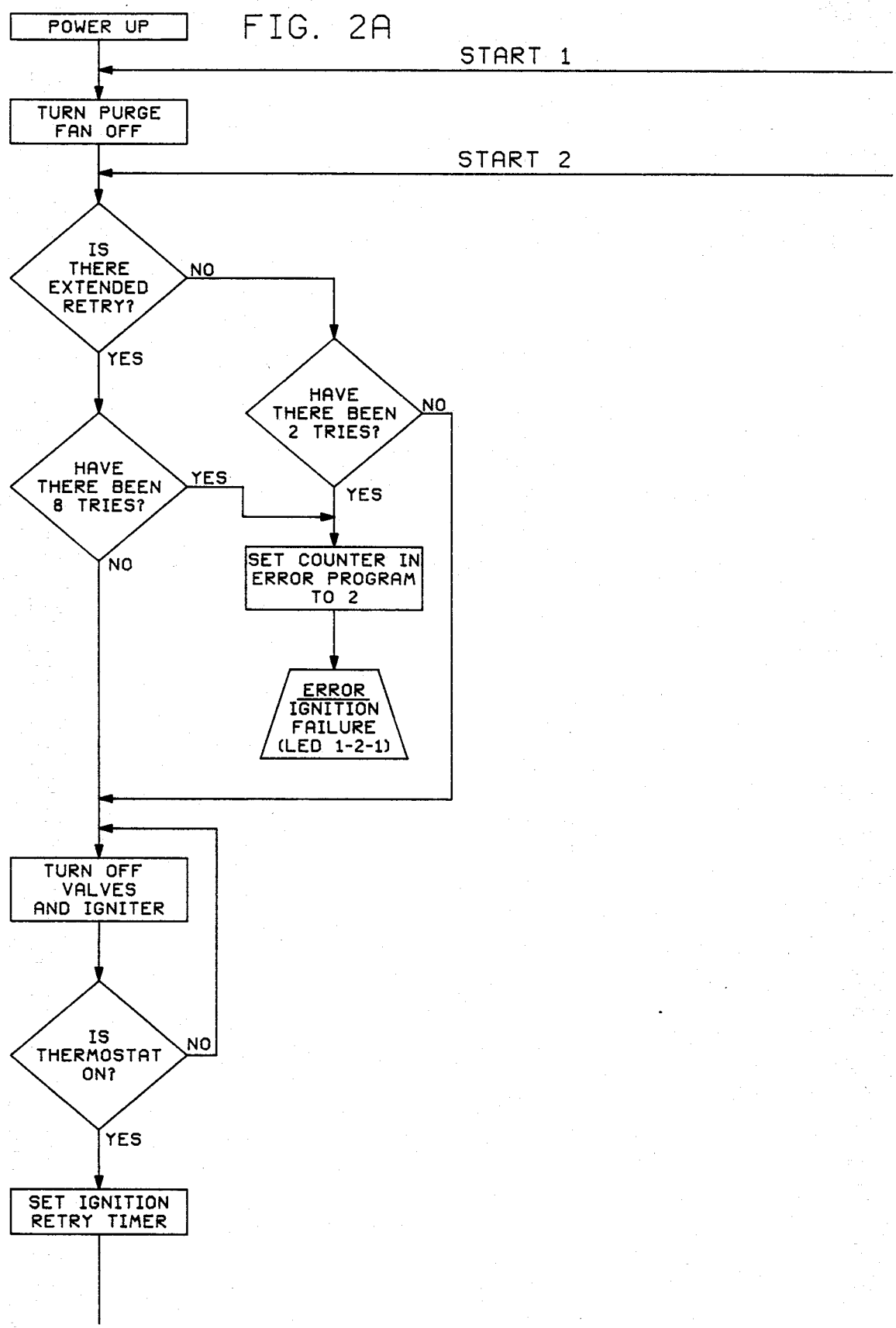

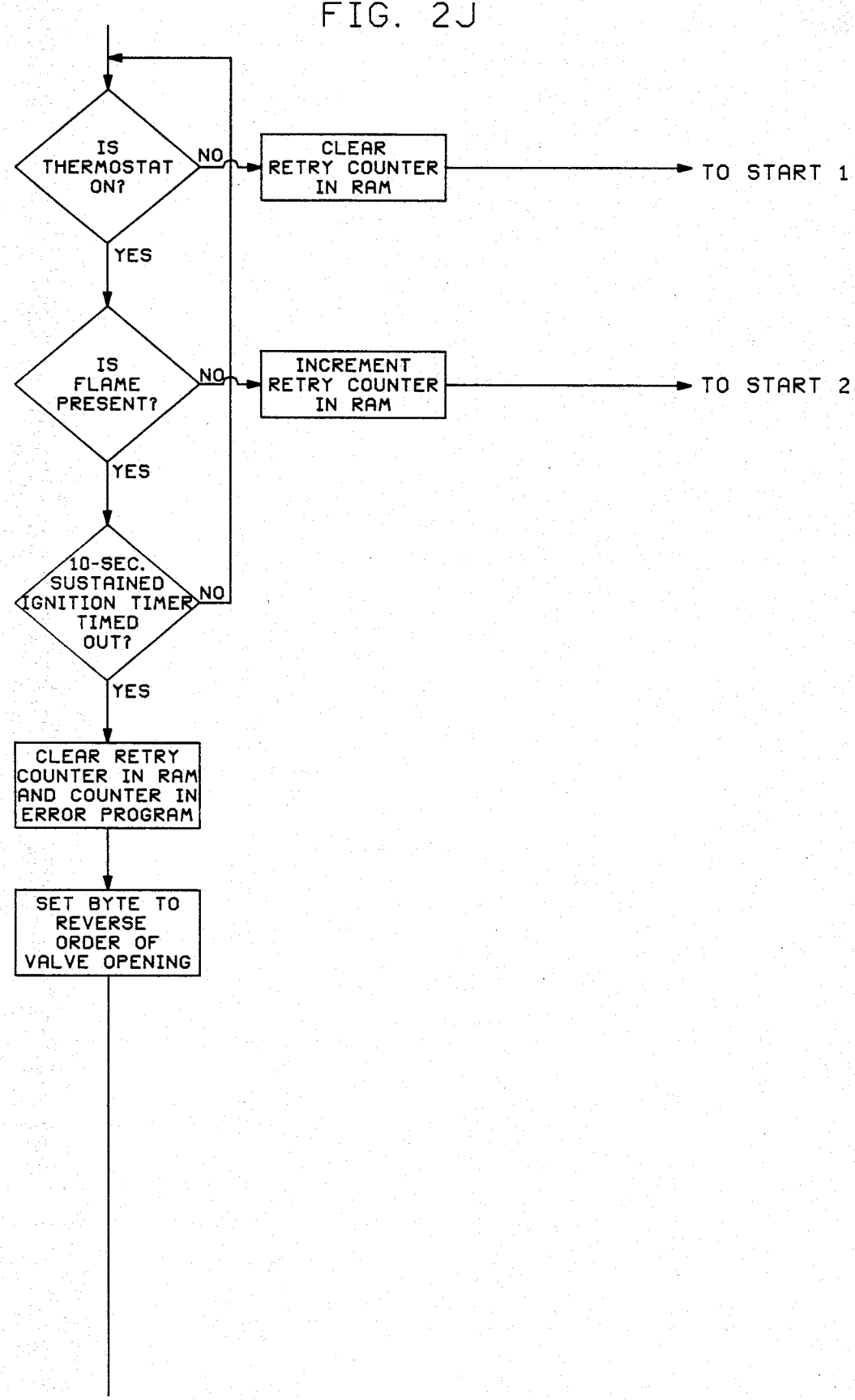

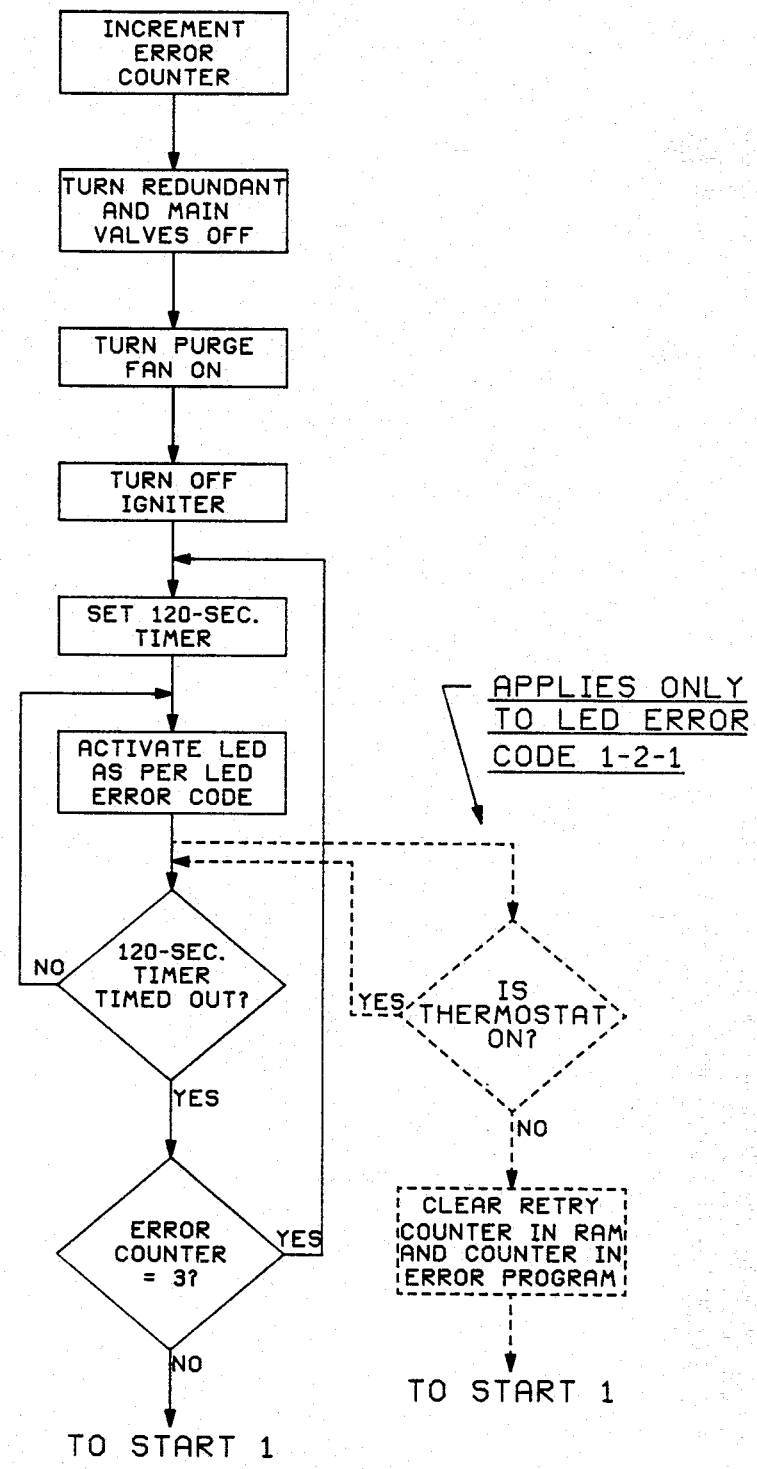

LED ERROR CODE

| SIGNAL | PROBLEM | REF. FIG. |
|---|---|---|
| 1-1-1...1-1-1... | SHORTED OR OPEN IGNITER | 2D |
| 1-1-2...1-1-2... | SHORTED FLAME PROBE | 2F |
| 1-1-3...1-1-3... | FAULTY PURGE FAN OR PRESS. SW. | 2C,2L |
| 1-2-1...1-2-1... | IGNITION FAILURE | 2A |
| 1-2-2...1-2-2... | VALVE COIL OR DRIVER FAILURE | 2G |
| 1-2-3...1-2-3... | VALVE FAILURE TO CLOSE | 2H |
| 1-3-1...1-3-1... | ELECTRICAL NOISE INTERFERENCE | |
| STEADY ON | HARDWARE FAULT | 2B,2F,2I |
| STEADY OFF | POWER FAILURE | |

FOR LED ERROR CODE SIGNAL 1-2-2... 1-2-2...

TIME IN 300-MILLISECOND INCREMENTS

DIRECT IGNITION GAS BURNER CONTROL SYSTEM

CROSS-REFERENCE TO RELATED APPLICATIONS

This application is related to U.S. patent application Ser. No. 296,818 filed Aug. 27, 1981, now U.S. Pat. No. 4,444,551 for "DIRECT IGNITION GAS BURNER CONTROL SYSTEM" by Carl J. Mueller, et al., assignors to the assignee of the present invention.

BACKGROUND OF THE INVENTION

This invention relates to electrically operated control systems for controlling operation of a main gas burner wherein the burner is directly ignited.

Due to the ever-increasing need for conservation of energy, direct ignition gas burner control systems, wherein a main burner is directly ignited by sparks or an electrical resistance igniter thereby eliminating the conventional standing pilot, are becoming more widely used. While the prior art discloses various such systems which appear to provide the required controlling functions, they are generally quite complex and costly.

The advancements in microcomputer technology have made it economically attractive to construct a direct ignition gas burner control system utilizing a microcomputer. The microcomputer and related circuitry not only enable a considerable cost savings in providing system functions heretofore provided by discrete electrical and mechanical components, but also enable a versatility not found in prior systems.

SUMMARY OF THE INVENTION

It is, therefore, a primary object of this invention to provide a generally new and improved direct ignition gas burner control system utilizing a microcomputer.

In accordance with the present invention, a direct ignition gas burner control system comprises an electrical resistance igniter, two serially-arranged gas valves for controlling the flow of gas to the burner, and a microcomputer and related circuitry for controlling energizing of the igniter and valves.

In the preferred embodiment, a microcomputer is programmable to provide various desired system functions and to provide a choice of time periods for some such functions. For example, the microcomputer is programmable to provide a pre-purge time period of 0, 30, 60, or 90 seconds, a post-purge time period of 0, 30, or 60 seconds, a trial ignition time period of 4, 7, 30, or 60 seconds, and a choice of the length of a warmup time period for the igniter. The microcomputer is further programmable to provide for a choice in the number of attempts at ignition to be made before the system locks out.

The microcomputer and related circuitry provide for numerous checks on the integrity of the system components. For example, the igniter is checked to determine if it is open or shorted; the flame probe is checked to determine if it is shorted to the burner; the purge fan, if used, and its pressure switch are checked to determine if they function properly; the valve windings are checked to determine if they are open or shorted; and valve leakage is checked to determine if either valve allows gas to flow when they are electrically de-energized. In addition, the various circuit means connecting the microcomputer to the valves, igniter, and flame probe are checked to determine if they are functional.

Another feature of the system includes a visual means for indicating the problem causing the system to be in a lock-out condition.

The above mentioned and other objects and features of the present invention will become apparent from the following description when read in conjunction with the accompanying drawings.

BRIEF DESCRIPTION OF THE DRAWINGS

FIGS. 2A through 2L, when combined, is a flow chart depicting the logic sequence programmed into and executed by the microcomputer of the system of combined FIGS. 1A, 1B, and 1C;

FIG. 3 is a flow chart of the error program;

DESCRIPTION OF THE PREFERRED EMBODIMENT

Figure 1A:
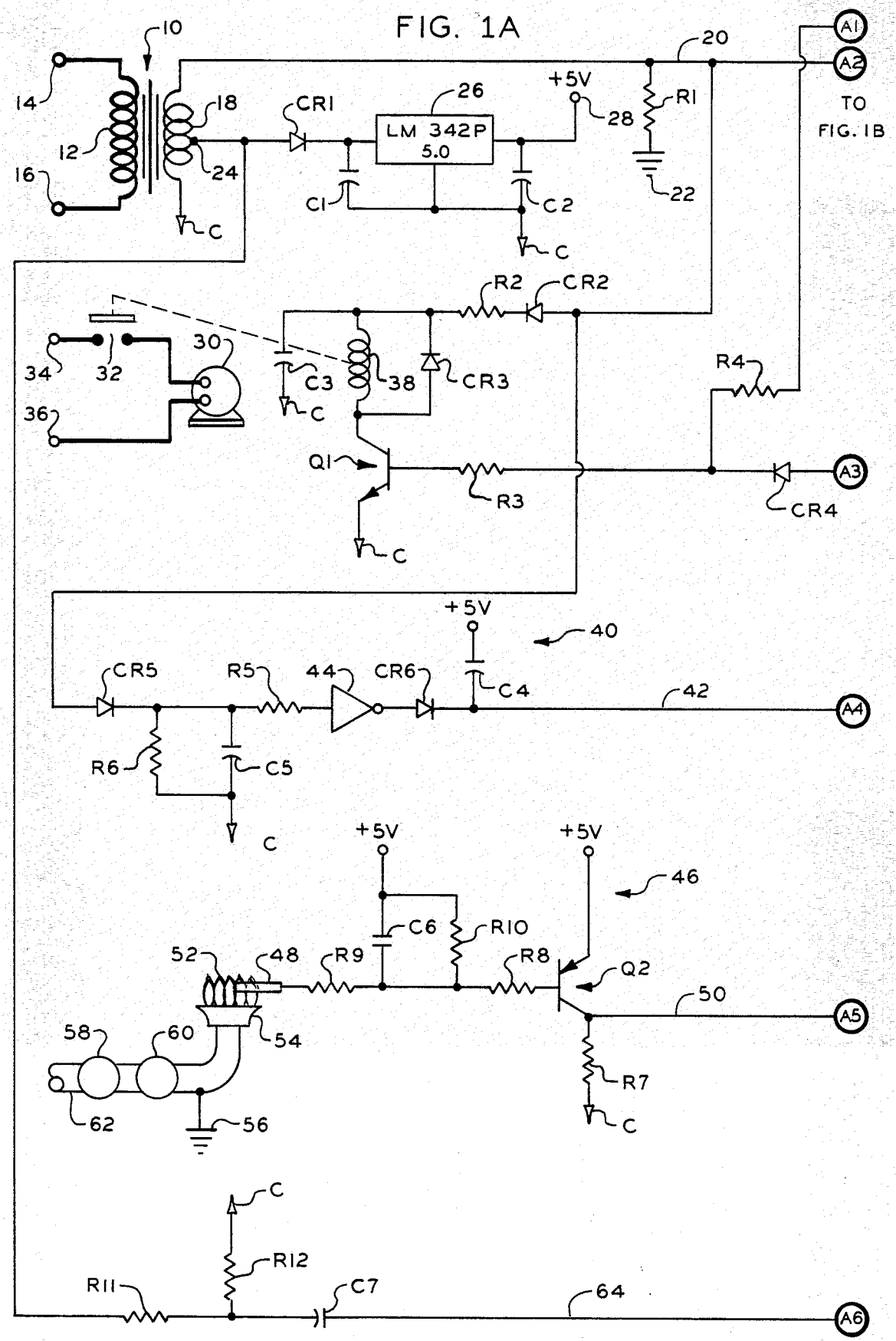
FIGS. 1A, 1B, and 1C, when combined, is a diagrammatic illustration of a burner control system constructed in accordance with the present invention.
Figure 1B:
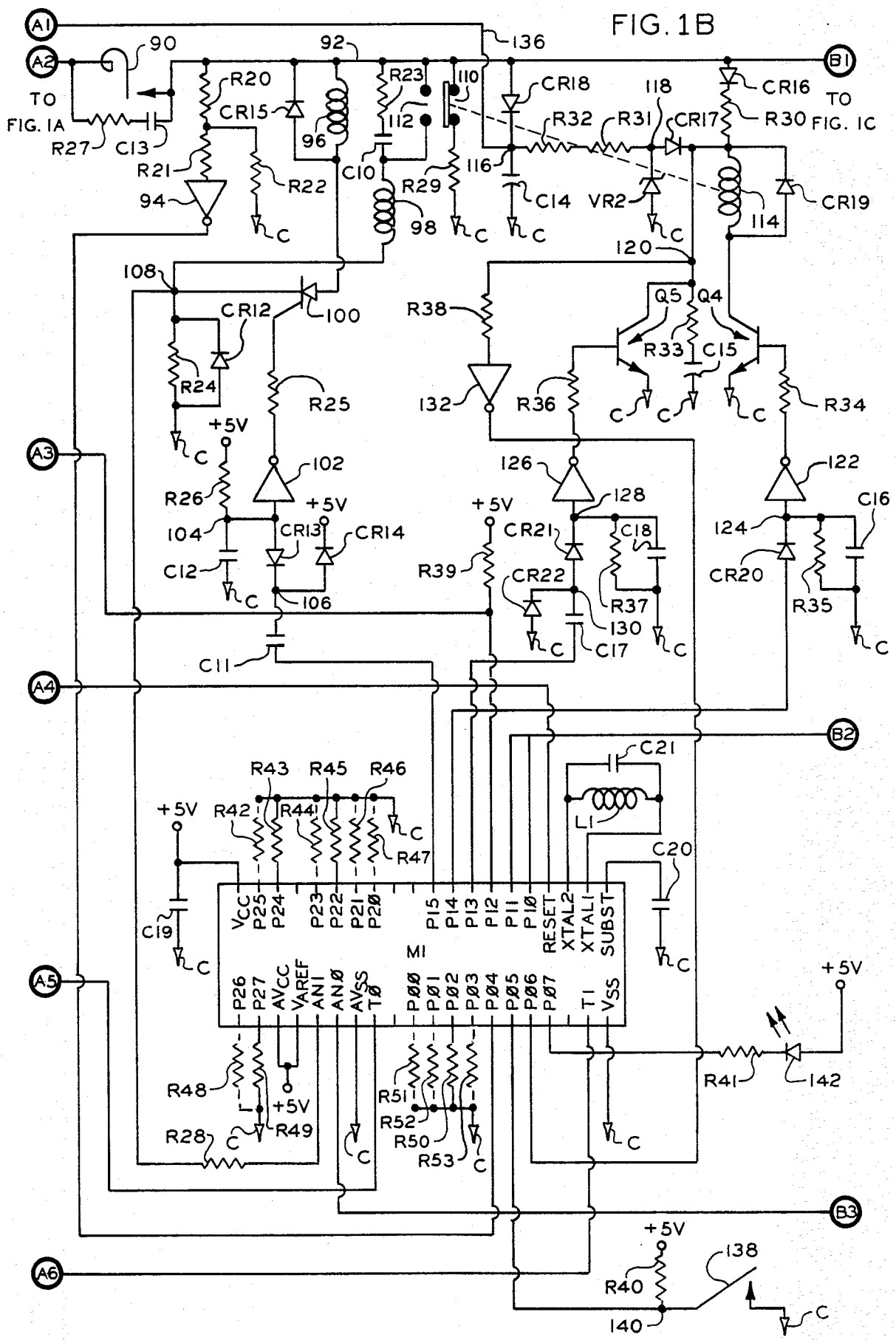
Figure 1C:
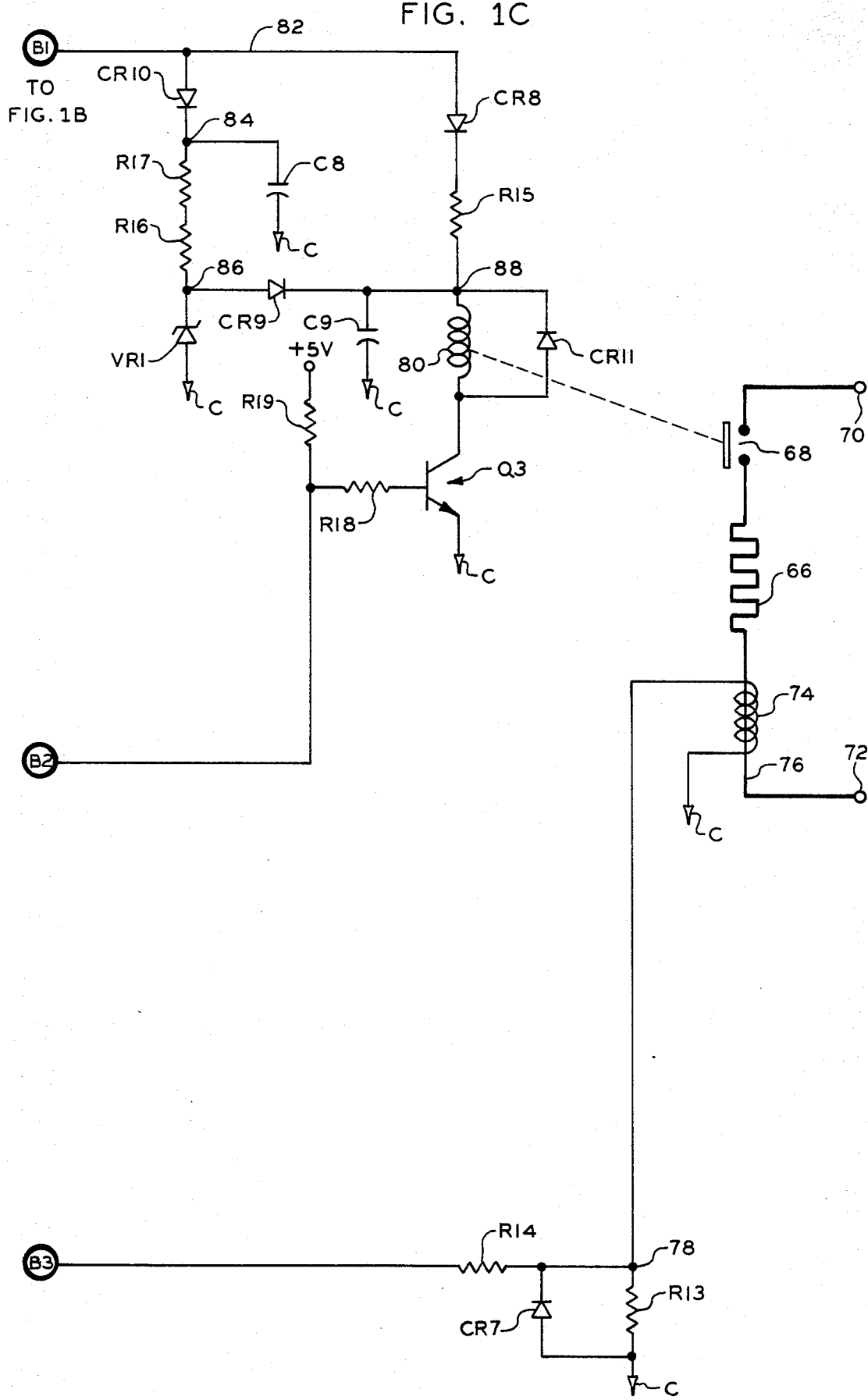

The diagrammatic illustration of the burner control system of the present invention is obtained by placing FIG. 1A to the left of FIG. 1B and FIG. 1C to the right of FIG. 1B. When so combined, the connecting points A1 through A6 of FIG. 1A are aligned with points A1 through A6 of FIG. 1B, and points B1, B2, and B3 of FIG. 1B are aligned with points B1, B2, and B3 of FIG. 1C.

Referring to FIG. 1A, the control system of the present invention includes a voltage step-down transformer 10 having a primary winding 12 connected to terminals 14 and 16 of a conventional 120 volt alternating current power source. One end of the secondary winding 18 of transformer 10 is connected to chassis common C which is isolated from earth ground. The other end of secondary winding 18 is connected through a lead 20 to connecting point A2 and provides a 24 volt alternating current power source between lead 20 and common C. A resistor R1 is connected between lead 20 and earth ground at 22 and prevents the flow of excessively high current through secondary winding 18 if common C should accidentally be connected to earth ground.

Secondary winding 18 has a center tap 24 which is connected through a controlled rectifier CR1 and a commercially-available 5 volt regulated power supply 26 to a terminal 28 so as to provide a +5 volt unidirectional power source between terminal 28 and common C. A filter capacitor C1 is connected between the cathode of rectifier CR1 and common C, and a capacitor C2, for suppressing transients, is connected between terminal 28 and common C.

A blower 30, hereinafter referred to as the purge fan, is connected through a set of normally-open relay contacts 32 to terminals 34 and 36 of a conventional 120 volt alternating current power source. Purge fan 30 is in air-flow communication with the combustion chamber of a furnace (not shown). When gas is flowing into the combustion chamber, fan 30 provides the air required for obtaining a combustible air-gas mixture and provides a positive means for forcing the products of combustion out of the combustion chamber through the flue. Also, immediately before and after burner operation, when gas is not flowing, fan 30 is energizable to purge the combustion chamber of any accumulated unburned flue or products of combustion. The utilization of purge fan 30 is required for direct ignition burner control systems in which the combustion chamber is sealed. It is to be understood, however, that there are other systems in which a purge fan is not required and can be omitted.

Relay winding 38, which controls relay contacts 32, is connected at one end through a resistor R2 and a rectifier CR2 to lead 20, and at its other end through the emitter-collector circuit of an NPN transistor Q1 to common C. A filter capacitor C3 is connected between common C and the junction between relay winding 38 and resistor R2 to aid in maintaining relay winding 38 energized during the half-cycle in which rectifier CR2 blocks current flow. The anode of a rectifier CR3 is connected to the collector of transistor Q1 and the cathode thereof to the junction between relay winding 38 and resistor R2. Rectifier CR3 is effective to suppress any back EMF generated by relay winding 38 when it is de-energized, so as to protect transistor Q1 from any high voltages or high currents due to such EMF generation.

Conduction of transistor Q1, and thus energizing of relay winding 38, is controlled by two separate circuits, as will be hereinafter described, connected to the base of transistor Q1. One circuit is connected from the base of transistor Q1 through a resistor R3 and another resistor R4 to connecting point A1, and the other circuit is connected through resistor R3 and a rectifier CR4 to connecting point A3. When either of the two controlling circuits is energized, transistor Q1 is gated on, causing relay winding 38 to be energized.

A reset circuit for initializing microcomputer M1 is shown generally at 40 in FIG. 1A. Reset circuit 40 includes a capacitor C4 connected between the +5 volt source and a lead 42 which is connected through connecting point A4 to the RESET port of microcomputer M1. A high value of resistance, approximately 50k ohms, is provided internally in microcomputer M1 between the RESET port and common C. Thus, when reset circuit 40 is initially energized, the voltage at the RESET port is high, causing the microcomputer M1 to reset. As capacitor C4 charges, the voltage at the RESET port decreases, causing the microcomputer M1 to go into its run mode.

Reset circuit 40 also includes a rectifier CR5, a resistor R5, an inverter 44, and a rectifier CR6 connected in series between leads 20 and 42, and a resistor R6 and a capacitor C5 connected in parallel with each other between the cathode of rectifier CR5 and common C. This portion of the reset circuit 40 functions in cooperation with capacitor C4 to provide proper reset in the event of a momentary power interruption. Specifically, when power is interrupted, capacitor C5 discharges through resistor R6, causing a low on the input of inverter 44. The output of inverter 44 is therefore high, which makes line 42 high and neutralizes capacitor C4. This high on line 42 causes microcomputer M1 to reset. As long as the +5 volt source is held up, line 42 remains high, preventing microcomputer M1 from going into the run mode. When power resumes, capacitor C5 is again charged, causing the output of inverter 44 to go low and thus enable capacitor C4 to again enable the reset and subsequent run mode functions.

A flame rectification circuit is shown generally at 46 in FIG. 1A. Circuit 46 includes a PNP transistor Q2 having its emitter connected to the +5 volt source and its collector connected through a resistor R7 to common C. Series connected to the base of transistor Q2 are resistors R8 and R9 and a flame probe 48. A capacitor C6 and a resistor R10 are connected in parallel with each other between the +5 volt source and the junction of resistors R8 and R9. The collector of transistor Q2 is further connected to lead 50 which is connected through connecting point A5 to port T bit Ø of microcomputer M1. (Hereinafter, for brevity, the port and bit will be referred to as pins, such as pin TØ.)

Flame probe 48 is positioned so as to be impinged by a burner flame 52 emitted from a burner 54. Burner 54 is grounded at 56. The flow of gas to burner 54 is controlled by two valves 58 and 60 connected fluidically in series in a gas conduit 62 leading from a gas source (not shown) to burner 54.

In the absence of burner flame 52, transistor Q2 is off. With transistor Q2 off, its collector is low, causing pin TØ to be low. Thus, in the absence of burner flame 52, pin TØ is low.

When burner flame 52 exists, transistor Q2 is biased on through the burner flame 52 during the half-cycle that current flows through burner flame 52, and by the discharge of capacitor C6 during the non-conducting half-cycle of burner flame 52. Specifically, during the conducting half-cycle of burner flame 52, transistor Q2 is biased on from the +5 volt source through the emitter-base circuit of transistor Q2, resistors R8 and R9, probe 48, flame 52, burner 54, ground 56, ground 22, resistor R1, lead 20, secondary winding 18, to common C. Capacitor C6 is also charged during this conducting half-cycle. When the voltage on secondary winding 18 reverses, burner flame 52 blocks the reverse polarity current. During this reverse polarity cycle, capacitor C6 discharges through the emitter-base circuit of transistor Q2 and resistor R8 to keep transistor Q2 biased on. With transistor Q2 on, its collector is high, causing pin TØ to be high. Thus, in the presence of burner flame 52, pin TØ is high. The values of the circuit components are such that capacitor C6 can maintain transistor Q2 conductive for approximately 80 milliseconds.

Connected between center tap 24 of secondary winding 18 and pin T1 of microcomputer M1 through connecting point A6 and a lead 64 are a series-connected resistor R11 and a capacitor C7. Another resistor R12 is connected between common C and the junction of resistor R11 and capacitor C7. This circuitry provides a time base to pin T1 of microcomputer M1, the time base being determined by the frequency of the power source at terminals 14 and 16.

Referring to FIG. 1C, an electrical resistance igniter 66, preferably a negative temperature coefficient silicon-carbide igniter, is connected through a set of normally-open relay contacts 68 to terminals 70 and 72 of a conventional 120 volt alternating current power source. Although not specifically illustrated as such, igniter 66 is positioned adjacent burner 54 so that, when sufficiently heated, it is effective to ignite the gas emitted from burner 54. Preferrably, igniter 66 is not impinged by the burner flame 52.

When initially energized, igniter 66 has a resistance such that the current flow therethrough is approximately 1 ampere. When heated to a temperature sufficiently high to ignite gas, its resistance decreases such that the current flow is approximately 5 amperes. Signals indicative of the values of current flow are transmitted to microcomputer M1. The circuit means for transmitting these signals comprises an isolating coupling circuit including a coil 74, comprised of approximately 3000 turns of 39 gauge wire, wrapped around a lead 76 connecting igniter 66 to terminal 72. One end of coil 74 is connected to common C and the other end through a resistor R13 to common C, thus forming a complete electrical circuit loop. Pin AN∅ of microcomputer M1 is connected through connecting point B3 and a dropping resistor R14 to a junction 78 between coil 74 and resistor R13. When current flows through igniter 66, a voltage is induced in coil 74. This voltage causes a current to flow through coil 74 and resistor R13. Pin AN∅ is responsive to the voltage at junction 78 which voltage is determined by the voltage across resistor R13, to perform its controlling function as will be hereinafter described. The cathode of a rectifier CR7 is connected to junction 78 and its anode to common C so as to prevent any negative polarity signals from being transmitted to pin AN∅ of microcomuter M1.

A relay winding 80 for controlling relay contacts 68 is connected at one end to a lead 82 through a resistor R15 and a rectifier CR8, and at its other end to common C through an NPN transistor Q3. Lead 82 is connected through the circuitry of FIG. 1B to lead 20 of FIG. 1A so that it has an alternating current potential of 24 volts. Relay winding 80 is also connected to lead 82 through a rectifier CR9, resistors R16 and R17, and a rectifier CR10. A capacitor C8 is connected between common C and the junction 84 of rectifier CR10 and resistor R17. A voltage regulator VR1 is connected between common C and the junction 86 of rectifier CR9 and resistor R16. A capacitor C9 is connected between common C and the junction 88 of relay winding 80 and resistor R15, and a rectifier CR11 is connected between junction 88 and the collector of transistor Q3. The base of transistor Q3 is connected through a resistor R18 and connecting point B2 to pins P1∅ and P11, which are connected together, of microcomputer M1. The base of transistor Q3 is also connected to the +5 volt source through resistor R18 and a resistor R19.

To effect energizing of relay winding 80, it is necessary to charge capacitor C9 to a voltage sufficiently high to effect pull-in of relay winding 80 upon discharge thereof. Since capacitor C9 is in parallel with series-connected relay winding 80 and transistor Q3, it is necessary that transistor Q3 be off in order to enable capacitor C9 to charge. When transistor Q3 is off, capacitor C9 is charged through two circuits. The first circuit includes rectifier CR10, resistors R17 and R16, and rectifier CR9. Voltage regulator VR1 limits the voltage at junction 86 to 5.6 volts so that the voltage at junction 88, when rectifier CR9 is conducting, is approximately 5 volts. Relay winding 80 can be held in by approximately 3.5 volts but requires at least 7 volts to effect pull-in thereof. This first circuit, therefore, cannot effect pull-in. The second circuit includes rectifier CR8 and resistor R15. This second circuit enables the charging of capacitor C9 to the peak voltage of the 24 volt alternating current potential on lead 82. When capacitor C9 is charged to this peak voltage, it is capable of effecting pull-in of relay winding 80. The values of resistors R15, R16, and R17, and capacitor C9 are such that capacitor C9 is charged to the required pull-in voltage level within 2 seconds. Therefore, when transistor Q3 is subsequently turned on after being off for 2 seconds, capacitor C9 discharges through relay winding 80 and transistor Q3, effecting the pull-in of relay winding 80.

Once relay winding 80 is pulled in, the voltage at junction 88 decreases due to the impedance of resistor R15 being considerably greater than the impedance of relay winding 80. However, due to voltage regulator VR1, the voltage at junction 88 is held at approximately 5 volts, a level sufficient to maintain energizing of relay winding 80. Thus, once relay winding 80 is pulled in, it is maintained energized or held in through rectifier CR10, resistors R17 and R16, and rectifier CR9. Capacitor C8 acts as a filter to maintain current flow through relay winding 80 during the half-cycles of the alternating current supply in which rectifiers CR8 and CR10 block current flow.

Rectifier CR11 suppresses any back EMF generated by relay winding 80 and thus protects transistor Q3 from any high voltages or high currents due to such EMF generation.

Pins P1∅ and P11 of microcomputer M1 control conduction of transistor Q3. When pins P1∅ and P11 are low, microcomputer M1 acts as a sink and prevents forward biasing of transistor Q3. Therefore, when it is desired to energize relay winding 80, pins P1∅ and P11 provide a low for 2 seconds so as to bias transistor Q3 off which enables capacitor C9 to charge to the required pull-in voltage value. After 2 seconds, pins P1∅ and P11 provide a high. When pins P1∅ and P11 are high, transistor Q3 is biased on, the biasing current being largely provided from the +5 volt source through pull-up resistor R19. With transistor Q3 on, capacitor C9 discharges, effecting pull-in of relay winding 80.

When it is desired that relay winding 80 remain in a de-energized condition, the output of pins P1∅ and P11 is a repetitive signal of a high of 92 milliseconds duration and a low of 8 milliseconds duration. The low on pins P1∅ and P11 biases transistor Q3 off. With transistor Q3 off, capacitor C9 begins to charge but cannot charge any significant amount in only 8 milliseconds. Also, with transistor Q3 off for 8 milliseconds, de-energizing of relay winding 80 is ensured since relay winding 80 requires approximately only 4 milliseconds to be de-energized. The high on pins P1∅ and P11 biases transistor Q3 on. Since capacitor C9 was not significantly charged, it cannot effect pull-in of relay winding 80.

Referring to FIG. 1B, a space thermostat 90 is connected through connecting point A2 and lead 20 to one side of secondary winding 18 of transformer 10 of FIG. 1A, and through a lead 92 and connecting point B1 to lead 82 of FIG. 1C. Connected in series between lead 92 and pin P∅4 of microcomputer M1 are a resistor R20, a resistor R21, and an inverter 94. Another resistor R22 is connected between common C and the junction of resistors R20 and R21. When thermostat 90 is closed, the input of inverter 94 is high, causing the output of inverter 94 to be low. This low is transmitted to pin P∅4 and is the signal to microcomputer M1 that thermostat 90 is in the closed or on position.

Also connected to lead 92 is a first valve winding 96 and, through a capacitor C10 and a resistor R23, a second valve winding 98. Valve winding 96 controls valve 58 of FIG. 1A, and valve winding 98 controls valve 60 therein. Valve 58 and valve winding 96 will hereinafter be referred to as the redundant valve 58 and redundant valve winding 96, respectively, and valve 60 and valve winding 98 will hereinafter be referred to as the main valve 60 and main valve winding 98, respectively. Regardless of nomenclature applied to valves 58 and 60 and their controlling windings, it is to be understood that both valves 58 and 60 must be open to enable gas to flow to burner 54 and that the closure of either of the two valves will terminate gas flow to burner 54. It is also to be understood that valves 58 and 60 can be separate devices as illustrated or a unitary device. It is to be noted that utilization of a redundant valve arrangement, wherein two serially-connected valves control the flow of gas to a main burner, is well known in the art.

Controlling the energizing of redundant valve winding 96 is an SCR 100 (silicon-controlled rectifier). The anode of SCR 100 is connected to redundant valve winding 96 and the cathode thereof is connected through a resistor R24 to common C. A rectifier CR12 is connected in parallel with resistor R24. The gating circuit for SCR 100 is connected to pin P15 of microcomputer M1 and includes the series connection of a resistor R25, an inverter 102, a rectifier CR13, and a capacitor C11. The gating circuit also includes a resistor R26 connected between the +5 volt source and the input of inverter 102 at a junction 104, and a capacitor C12 connected between junction 104 and common C. The gating circuit further includes a rectifier CR14 connected between the +5 volt source and a junction 106 between rectifier CR13 and capacitor C11. SCR 100 and its gating circuit is sometimes hereinafter referred to as the redundant valve driver circuit.

When it is desired to keep redundant valve winding 96 de-energized, a constant high signal appears at pin P15 of microcomputer M1. This constant high is prevented by capacitor C11 and rectifier CR13 from effecting the status of inverter 102 and enables capacitor C12 to charge through resistor R26. When capacitor C12, which is connected to the input of inverter 102, is sufficiently charged, it provides a high on the input of inverter 102. The resulting low on the output of inverter 102 inhibits the conduction of SCR 100.

When it is desired to energize redundant valve winding 96, a high-low signal of 500 HZ appears at pin P15 of microcomputer M1. When the signal is initially low, capacitor C12 rapidly discharges through rectifier CR13, capacitor C11, and microcomputer M1. This rapid discharge causes the input of inverter 102 to become low enough to effect a change in its state whereby the output of inverter 102 becomes high and effects gating of SCR 100 into conduction. When the 500 HZ signal is high, capacitor C12 begins to charge but is prevented by the high resistance valve of resistor R26 and the short time duration of the high portion of the 500 HZ signal from charging sufficiently to change the state of inverter 102. Thus, with the 500 HZ signal on pin P15, the output of inverter 102 remains high, enabling SCR 100 to conduct.

A rectifier CR15 is connected across redundant valve winding 96 to enable winding 96 to remain energized during the half-cycle in which SCR 100 does not conduct. A snubber circuit, comprising a series-connected resistor R27 and a capacitor C13, is connected across thermostat 90. This snubber circuit is effective to prevent any inductive spikes generated by redundant valve winding 96 when thermostat 90 opens, from being transmitted to microcomputer M1. The status of SCR 100, that is, whether SCR 100 is or is not conducting, is monitored by pin AN1 of microcomputer M1. As shown, pin AN1 is connected through a dropping resistor R28 to the cathode of SCR 100 at a junction 108 between the cathode of SCR 100 and resistor R24. Rectifier CR12 is effective to protect pin AN1 from any reverse bias voltage.

Controlling the energizing of main valve winding 98 is a relay comprising a set of normally-closed contacts 110, a set of normally-open contacts 112, and a controlling electrical winding 114. Relay contacts 110 are connected in series with a resistor R29 between lead 92 and common C to enable the system of the present invention to be used with a thermostat which draws a small amount of current during its off mode. When relay contacts 112 are closed, main valve winding 98 is energized from lead 92, through contacts 112, to junction 108, and through resistor R24 to common C. Resistor R23 and capacitor C10 comprise a snubber circuit which is effective to prevent any inductive spikes generated by main valve winding 98 when relay contacts 112 open, from being transmitted to microcomputer M1.

As previously described, pin AN1 of microcomputer M1 is connected to junction 108 and is effective to monitor the status of SCR 100. Since main valve winding 98 is also connected to junction 108, pin AN1 is rendered effective to monitor both valve windings 96 and 98. Specifically, when the current draws of valve windings 96 and 98 are known, the voltage drop across resistor R24, reflected at junction 108, indicates to pin AN1 whether none, or one, or both valve windings 96 and 98 are energized, or shorted, or open.

Relay winding 114 is connected at one end to lead 92 through a resistor R30 and a rectifier CR16, and at its other end to common C through the emitter-collector circuit of an NPN transistor Q4. Relay winding 114 is also connected to lead 92 through a rectifier CR17, resistors R31 and R32, and a rectifier CR18. A capacitor C14 is connected between common C and the junction 116 of rectifier CR18 and resistor R32. A voltage regulator VR2 is connected between common C and the junction 118 of rectifier CR17 and resistor R31. A rectifier CR19 is connected across relay winding 114.

A capacitor C15 is connected from common C through a resistor R33 to a junction 120 between rectifier CR17 and relay winding 114. Also connected from common C to junction 120 is an NPN transistor Q5.

The base of transistor Q4 is connected through a resistor R34, an inverter 122, and a controlled rectifier CR20 to pin P14 of microcomputer M1. A low-pass filter arrangement of a parallel-connected resistor R35 and capacitor C16 is connected between common C and the junction 124 between rectifier CR20 and inverter 122. Transistor Q4 and its biasing circuit is sometimes hereinafter referred to as the main valve driver circuit.

The base of transistor Q5 is connected through a resistor R36, an inverter 126, a rectifier CR21, and a capacitor C17 to pin P13 of microcomputer M1. A high-pass filter arrangement of a parallel-connected resistor R37 and capacitor C18 is connected between common C and the junction 128 between rectifier CR21 and inverter 126. A rectifier CR22 is connected between common C and the junction 130 between capacitor C17 and rectifier CR21. Transistor Q5 and its biasing circuit is sometimes hereinafter referred to as the main valve clamp.

The conduction and non-conduction of transistor Q5 is monitored by pin P06. As shown, pin P06 is connected to junction 120 through an inverter 132 and a resistor R38.

To effect energizing of relay winding 114, it is necessary to charge capacitor C15 to a voltage sufficiently high to effect pull-in of relay winding 114 upon discharge thereof. Since C15 is in parallel with series-connected relay winding 114 and transistor Q4, and in parallel with transistor Q5, it is necessary that both transistors Q4 and Q5 be off in order to enable capacitor C15 to charge.

When transistors Q4 and Q5 are off, capacitor C15 is charged through two circuits which are the same, except for a resistor R33, as the two circuits previously described for charging capacitor C9 in FIG. 1C. The first circuit includes rectifier CR18, resistors R32 and R31, rectifier CR17, and resistor R33. Voltage regulator VR2 limits the voltage at junction 118 to 5.6 volts so that the voltage at junction 120 between rectifier CR17 and relay winding 114, when rectifier CR17 is conducting, is approximately 5 volts. As was the case with relay winding 80, relay winding 114 also requires at least 7 volts to effect pull-in thereof, so this first circuit cannot effect pull-in. The second circuit includes rectifier CR16 and resistors R30 and R33. This second circuit enables the charging of capacitor C15 to the peak voltage of the 24 volt alternating current power source. When capacitor C15 is charged to this peak voltage, it is capable of effecting pull-in of relay winding 114. The values of resistors R30, R31, R32 and R33, and capacitor C15 are such that capacitor C15 is charged to the required pull-in voltage level within 2 seconds. Therefore, when transistor Q4 is turned on after being off for 2 seconds and transistor Q5 remains off, capacitor C15 discharges through resistor R33, relay winding 114, and transistor Q4, effecting pull-in of relay winding 114.

Once relay winding 114 is pulled in, the voltage at junction 120 decreases due to the impedance of resistor R30 being considerably greater than the impedance of relay winding 114. However, due to voltage regulator VR2, the voltage at junction 120 is held at approximately 5 volts, a level sufficient to maintain energizing of relay winding 114, which, as relay winding 80, can be held in by approximately 3.5 volts. Thus, once relay winding 114 is pulled in, it is held in through rectifier CR18, resistors R32 and R31, and rectifier CR17. Capacitor C14 acts as a filter to maintain current flow through relay winding 114 during the half-cycles of the alternating current supply in which rectifiers CR16 and CR18 block current flow. Rectifier CR19 suppresses any back EMF generated by relay winding 114 and thus protects transistors Q4 and Q5 from any high voltages or high currents due to such EMF generation. Resistor R33 is provided to protect transistor Q5 against a high current flow therethrough in the event that transistor Q5, due to a system malfunction, were to conduct with capacitor C15 fully charged and transistor Q4 off.

Pin P14 of microcomputer M1 controls conduction of transistor Q4. When it is desired that transistor Q4 be off, pin P14 is at a constant digital high. This constant high signal causes the input of inverter 122 to be high and thus the output thereof to be low. This low exists at the base of transistor Q4 so that transistor Q4 is biased off. When it is desired that transistor Q4 be conductive, pin P14 is at a constant digital low. This constant low signal causes the input of inverter 122 to be low and thus the output thereof to be high. This high enables transistor Q4 to be biased on through resistor R34.

Pin P13 of microcomputer M1 controls conduction of transistor Q5. When it is desired that transistor Q5 be on, a constant digital high signal appears at pin P13. This constant high effects the charging of capacitor C17 whereby junction 128 becomes low. This low at junction 128, which is connected to the input of inverter 126, causes the output of inverter 126 to be high. This high enables transistor Q5 to be biased on through resistor R36. When it is desired that transistor Q5 be off, a high frequency digital signal of approximately 500 HZ appears at pin P13. When this high frequency signal goes to its low portion, capacitor C17 discharges rapidly through pin P13 of microcomputer M1 and rectifier CR22, causing junction 128 to become high enough to cause inverter 126 to change its state whereby the output of inverter 126 becomes low and biases transistor Q5 off. When the high frequency signal at pin P13 goes to its high portion, capacitor C17 begins to charge but is prevented by the high resistance value of resistor R37 and the short time duration of the high portion of the 500 HZ signal from charging sufficiently to cause inverter 126 to change states. Thus, with the 500 HZ signal on pin P13, the output of inverter 126 remains low and prevents conduction of transistor Q5.

As previously stated, pin PØ6 monitors the conduction and non-conduction of transistor Q5. When transistor Q5 is conducting, junction 120 is low, causing the output of inverter 132 to transmit a high to pin PØ6. When transistor Q5 is off, junction 120 is high, causing the output of inverter 132 to transmit a low to pin PØ6.

As will be hereinafter described in more detail, various system malfunctions will cause the system to go into lock-out, a condition in which further operation of the system is prevented. During this lockout condition, the entire system remains connected to the power supply and thermostat 90 is closed.

The primary reason for the utilization of the two transistors Q4 and Q5, instead of just one transistor, is to prevent an unsafe condition from developing during such lock-out. Specifically, during lockout, transistor Q4 is biased off by a constant high signal at pin P14 of microcomputer M1. Transistor Q5 is biased on by a constant high signal at pin P13. Thus, even if voltage regulator VR2 were to fail and microcomputer M1 were to malfunction by providing a constant low signal at pin P14 to effect conduction of transistor Q4, relay winding 114 could not pull in since it would be shunted to common C through transistor Q5.

An additional factor to prevent a malfunction of microcomputer M1 from resulting in an unsafe condition is that the redundant valve winding 96 and relay winding 114, which controls main valve winding 98, are controlled by diverse signals in a single port P1 of microcomputer M1. Specifically, for SCR 100 to be on, the signal at pin P15 (port P1 bit 5) has to be a 500 HZ signal; for transistor Q5 to be off, the signal at pin P13 (port P1 bit 3) has to be a 500 HZ signal; and for transistor Q4 to be on, the signal at pin P14 (port P1 bit 4) has to be a constant low. It is believed extremely unlikely that a malfunction of microcomputer M1 could cause such a diverse condition to develop in a single port.

Microcomputer M1 is a single component 8-bit microcomputer with an on-chip 2-channel 8-bit A/D (analog to digital) converter. Contained within microcomputer M1 are an 8-bit CPU (central processing unit), a 2k×8 ROM (read only memory), a 64×8 RAM (random access read/write memory), 28 I/0 (input/output) lines, a clock, and an 8-bit timer/event counter. As shown in FIG. 1B, selected pins of microcomputer M1 are designated $V_{SS}$, $V_{CC}$, PØØ through PØ7, P1Ø through P15, P2Ø through P27, TØ and T1, RESET, $AV_{SS}$, $AV_{CC}$, SUBST, $V_{AREF}$, ANØ and AN1, XTAL1, and XTAL2.

Pin $V_{CC}$ of microcomputer M1 is connected to the +5 volt power supply and functions as the main power supply input to microcomputer M1. A capacitor C19 is connected between pin $V_{CC}$ and common C to suppress noise. Also connected to the +5 volt power supply are pin $AV_{CC}$, which is the power supply pin for the on-chip A/D converter, and pin $V_{AREF}$, which is the A/D reference voltage pin.

Pin $V_{SS}$ of microcomputer M1 is connected to common C and functions as the connection of microcomputer M1 to common C potential. Pin $AV_{SS}$ is connected to common C and functions to connect the A/D converter to common C potential. Pin SUBST is connected to common C through a capacitor C20 and functions to stabilize the substrate voltage.

An external timing control circuit for the on-chip oscillator comprises a capacitor C21 and an inductor L1 connected in parallel with each other between pins XTAL1 and XTAL2. The values of capacitor C21 and inductor L1 are such that the on-chip oscillator provides a cycle speed of approximately 9 microseconds.

Pin P12 of microcomputer M1 is connected to connecting point A3 and through a resistor R39 to the +5 volt source. As previously stated, conduction of transistor Q1 of FIG. 1A is controlled by two separate circuits. When thermostat 90 is closed, transistor Q1 is biased on through a first circuit including lead 92, rectifier CR18, a lead 136, connecting point A1, and resistors R4 and R3. Regarding system operation, this first circuit enables the purge fan 30 to be energized whenever thermostat 90 is calling for heat. The second circuit includes microcomputer M1 and resistor R39 and is effective to turn on transistor Q1 whenever pin P12 is high, regardless of the state of thermostat 90. This second circuit enables the purge fan 30 to be energized before and after burner operation so as to provide a desired pre-purge and post-purge of the combustion chamber.

A pressure switch 138, responsive to movement of air by purge fan 30, is connected between common C and pin PØ5 of microcomputer M1. A resistor R40 is connected from the +5 volt source to the junction 140 between switch 138 and pin PØ5. Pin PØ5 functions to monitor whether switch 138 is open or closed.

An LED 142 (light emitting diode) is connected between pin PØ7 and the +5 volt source through a resistor R41. As will hereinafter be described in more detail, LED 142 functions to provide, by means of specific on and off time durations, a visual indication of the cause of a system malfunction.

A plurality of resistors R42 through R53 are shown in FIG. 1B, some of which are connected to various pins of microcomputer M1 and others of which, as indicated by dashed lines instead of solid lines, are not connected. As will hereinafter be described, the connection or non-connection of resistors R42 through R53 is determined by the specific system operation desired.

For example, in the program of microcomputer M1, a digital high at pin P25 enables a post-purge function and a digital low disenables such function. With resistor R42 connected between pin P25 and common C, pin P25 would be low and the post-purge function would be disenabled. This mode of operation may be desirable in some systems. With resistor R42 not connected, pin P25 is high, enabling the post-purge function. The preferred embodiment of the present invention utilizes the post-purge function. Therefore, the reason for illustrating resistor R42 and other non-connected resistors is to describe more fully the versatility of the system of the present invention.

Resistor R43 is connected between pin P24 and common C. This resistor R43 establishes a post-purge time period of 60 seconds. If resistor R43 were not connected, the post-purge time period would be 30 seconds.

The connection or non-connection of resistors R44 and R45 to pins P23 and P22, respectively, establishes a desired pre-purge time period. With resistor R44 not connected and Resistor R45 connected as shown in FIG. 1B, the pre-purge time period is 30 seconds. If neither resistor R44 nor R45 were connected, the time period would be zero seconds; if both were connected, the time period would be 90 seconds; and if resistor R44 were connected and resistor R45 were not connected, the time period would be 60 seconds.

The connection or non-connection of resistors R46 and R47 to pins P21 and P2Ø, respectively, establishes a desired trial ignition time period. With neither resistor R46 nor R47 connected, as shown in FIG. 1B, the trial ignition time period is 4 seconds. If only resistor R46 were connected, the time period would be 30 seconds; if only resistor R47 were connected, the time period would be 7 seconds; and if both resistors R46 and R47 were connected, the time period would be 60 seconds.

The connection or non-connection of resistor R48 to pin P26 determines whether microcomputer M1 will monitor purge fan pressure switch 138. If resistor R48 were connected, no monitoring would occur; with resistor R48 not connected, as shown in FIG. 1B, monitoring will occur.

Resistor R49 is connected between pin P27 and common C. This resistor establishes a long warm-up time for igniter 66. If resistor R49 were not connected, the warm-up time would be shorter.

Resistor R50 is connected between pin PØ2 and common C. Resistor R50 establishes that the program of microcomputer M1 will provide an extended retry function, a function to be hereinafter described. If resistor R50 were not connected, there would be a limited retry.

The connection or non-connection of resistors R51, R52, and R53 between pins PØØ, PØ1, and PØ3, respectively, and common C, provides a parity check on various sytem parameters. Specifically, resistor R51 provides a check on the trial ignition time period which was established by the connection or non-connection of resistors R46 and R47. With resistor R51 not connected, the resulting signal at pin PØØ indicates that the selected trial ignition time period is 4 or 7 seconds; if resistor R51 were connected, the signal at pin PØØ would indicate that the time period selected was 30 or 60 seconds. Similarly, resistor R52 provides a parity check on the pre-purge time period which was established by the connection or non-connection of resistors R44 and R45. With resistor R52 not connected, the signal at pin PØ1 indicates that the selected pre-purge time period is 30, 60, or 90 seconds; if resistor R52 were connected, the signal at pin PØ1 would indicate a time period of zero seconds. Finally, resistor R53 provides a parity check on the enabling or disenabling of the monitoring of purge fan pressure switch 138 which was established by the connection or non-connection of resistor R48. With resistor R53 not connected, the resulting signal at pin PØ3 indicates that the enabling of monitoring was selected; if resistor R53 were connected, the signal at pin PØ3 would indicate that the disenabling of monitoring was selected.

OPERATION

FIGS. 2A through 2L is a flow chart illustrating the basic logic of the program incorporated in microcomputer M1. Since there are many steps therein referring to "ERROR", the details of the error program will be described prior to the description of the flow chart of FIGS. 2A through 2L.

Referring to FIG. 3, illustrated therein is the basic logic of the error program incorporated in microcomputer M1. When the error program is called up, an error counter is incremented. Concurrently, redundant valve 58 and main valve 60 are turned off by microcomputer M1 by providing the proper turn-off signals on pins P13, P14, and P15. Pin P12 of microcomputer M1 goes high to effect energizing of purge fan 30. Also, a 16.6-millisecond high, 16.6-millisecond low pulse is provided on pins P1∅ and P11 to effect de-energizing of igniter 66.

Figures 4, 5:
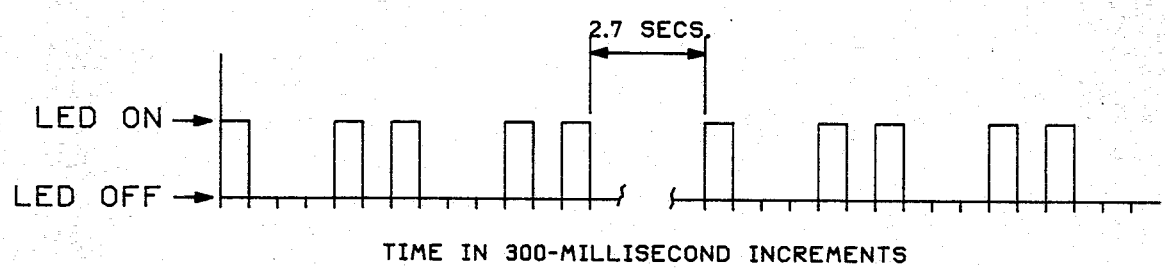
FIG. 4 is a table of the LED error code.
FIG. 5 is a graphical representation of a particular LED error code signal.

A timer is then set for 120 seconds and LED 142 is activated as per the LED error code illustrated in FIG. 4. For example, if the error is due to a valve coil (winding) or driver failure, the LED 142 will provide a signal shown in FIG. 5. Specifically, for such a failure, LED 142 will turn on for 300 milliseconds, off for 900 milliseconds, on for 300 milliseconds, off for 300 milliseconds, on for 300 milliseconds, off for 900 milliseconds, and then on and off two more times at 300-millisecond increments. After a delay of 2.7 seconds, the signal repeats. LED 142 continues to blink in this manner until the 120-second timer is timed out. When the timer is timed out, the error counter is checked. If the count is 3, the 120-second timer is reset and the program loop repeats. When in this loop, the system is in lock-out. If the count in error counter is less than 3, the program reverts back to "START 1", a point in the program to be hereinafter described.

The basic purpose of the lock-out condition is to prevent unsafe operation of the system. When the system is in lock-out, normal system operation is prevented and the LED error code of FIG. 4 enables a determination of the specific problem causing the lock-out condition to occur. With one exception, when the system is in lock-out, the only manner of returning to an attempt at normal operation is to momentarily interrupt the main power supply at terminals 14 and 16. Specifically, with one exception, when the system is in lock-out, normal operation cannot be resumed automatically or by manual actuation of thermostat 90.

The above exception is when lock-out is due to ignition failure. As shown in FIG. 3, when the LED error code is 1-2-1, the code which indicates ignition failure, microcomputer M1 checks if the thermostat 90 is on. If thermostat 90 is on, the system remains in lock-out. If, however, thermostat 90 is off, the retry counter in RAM (to be hereinafter described) and the counter in the error program are cleared, and the program reverts back to "START 1". Thus, when the system is in lock-out due to ignition failure, thermostat 90 can be manually turned off to enable a return to attempting normal operation. The intent of this feature is to enable the homeowner to attempt returning the system to normal operation when the cause of the lock-out may be a transient factor and does not result in an unsafe condition.

As previously stated, when a specific system problem results in lock-out, LED 142 is activated as per the LED error code illustrated in FIG. 4. When the system is operating normally, LED 142 blinks on and off at 800-millisecond increments. As shown in FIG. 4, the LED error code signal of 1-3-1 indicates an electrical noise interference, and the LED error code signal of being steady off indicates a power failure. The remaining error code signals will be hereinafter described in conjunction with a description of the flow chart of FIGS. 2A through 2L. It is noted that other means, visual or audible, could be used to indicate system errors. A particular advantage of the single LED 142 is that it consumes a minimal amount of energy.

Referring to FIG. 2A, when electrical power is applied to the system, operation thereof is initialized by a command illustrated as power up. Upon this command, the program counter and all RAM bits in microcomputer M1 are cleared to zero. A security code is entered in one byte of RAM. Any subsequent change in this security code would be indicative of an electrical noise interference and would cause LED 142 to blink as per the LED error code of FIG. 4. Also, all outputs of microcomputer M1 are such that valves 58 and 60 are closed, igniter 66 is de-energized, and purge fan 30 is off.

The program advances through the point in the program identified as "START 1". Pin P12 in microcomputer M1 goes low to prevent microcomputer M1 from effecting energizing of the purge fan 30. The program then advances through a point in the program identified as "START 2". A return of the program to "START 2" instead of to "START 1" bypasses the command from microcomputer M1 to turn off purge fan 30.

Microcomputer M1 then scans pin P∅2 to determine if there is to be extended retry. As previously described, the connection of resistor R50 to pin P∅2 provides for extended retry. When there is to be extended retry, there can be eight attempts, during a single thermostat-on time period, to ignite gas. Microcomputer M1 is programmed, when extended retry is in effect, to provide a 30-second delay between the first and second attempts, and to double the delay time between subsequent attempts. Such repeated attempts at ignition prevents nuisance lock-outs, and the delay time periods between attempts prevents the accumulation of large amounts of unburned gas. It is noted that since thermostat 90 would be on during these delay time periods, purge fan 30 would be energized.

If there is not to be extended retry, microcomputer M1 provides for only two attempts at ignition. Again, a 30-second delay is provided between the two attempts. This limited retry feature is preferable for burner systems using heavier-than-air gases, such as LP gas.

As indicated in FIG. 2A, if extended retry is in effect and there have been eight tries at ignition, or if limited retry is in effect and there have been two tries at ignition, the counter in the error program is set to 2. In the error program of FIG. 3, the error counter is incremented to 3 and the system goes into lock-out. As previously described, lock-out due to ignition failure can be aborted by manually turning thermostat 90 off.

If extended retry is in effect and there have been less than eight tries at ignition, or if limited retry is in effect and there have been less than two tries at ignition, the program effects turning off of valves 58 and 60 and igniter 66. Specifically, a constant high on pin P15 keeps SCR 100 off so as to prevent energizing of redundant valve winding 96, a constant high on pin P13 keeps transistor Q5 on and a constant high on pin P14 keeps transistor Q4 off so that relay winding 114, which controls main valve winding 98, is prevented from being energized, and pins P10 and P11 provide a repetitive 92-millisecond high and 8-millisecond low signal to prevent energizing of relay winding 80 which controls igniter 66. This function of positively turning off valves 58 and 60 and igniter 66 is provided because the program, up to this point, can be called upon after a previous unsuccessful attempt at ignition which resulted in a return to the "START 1" or "START 2" points in the program.

As long as thermostat 90 remains off, valves 58 and 60, igniter 66, and purge fan 30 remain de-energized. When thermostat 90 calls for heat, purge fan 30 is energized due to thermostat 90 closing, and an ignition retry timer is set. The time duration of the ignition retry timer is determined by whether there is extended retry or limited retry, and whether this is the first or a subsequent attempt at ignition during the present burner cycle initiated by thermostat 90. For example, if there is extended retry and the first and second attempts at ignition initiated by the closing of thermostat 90 were unsuccessful, the ignition retry timer is set for 60 seconds. As another example, if this is the first attempt at ignition initiated by thermostat 90, regardless of whether there is extended or limited retry, the ignition retry timer is set for zero seconds. As previously described, the time delay between unsuccessful attempts at ignition, during which time delay the purge fan 30 is on, prevents the accumulation of large amounts of unburned gas.

Figure 2B:
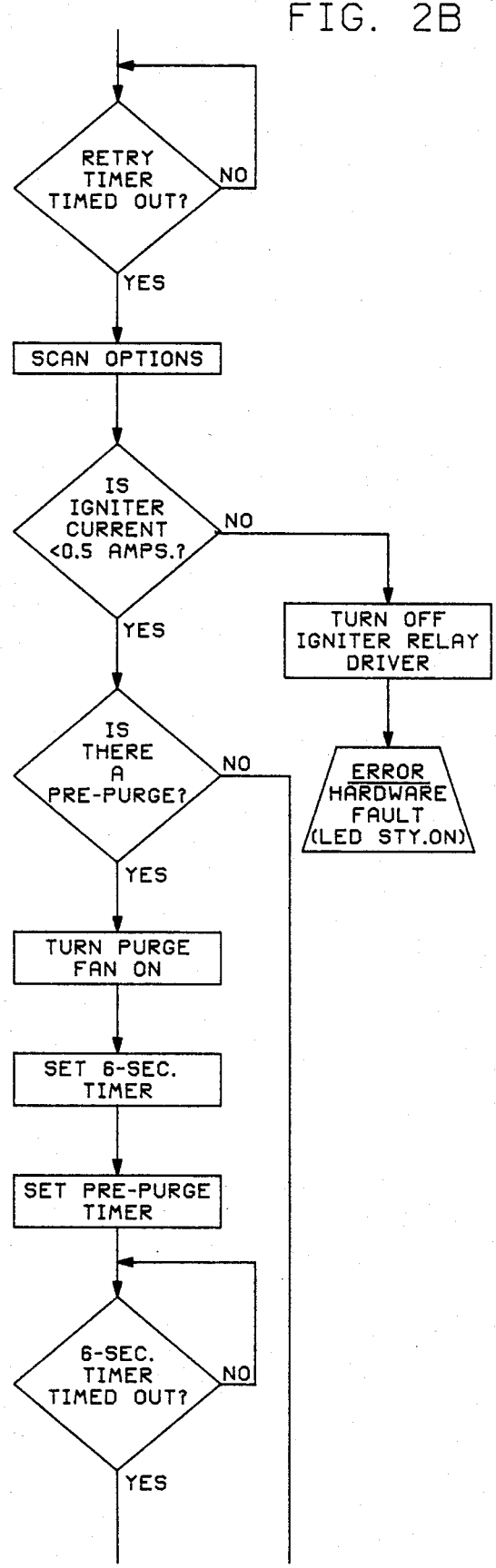

Referring to FIG. 2B, after the ignition retry timer is timed out, microcomputer M1 scans ports 0 and 2. Resistors R42 through R53, by virtue of their connection or non-connection, result in digital bits on ports 0 and 2 which are decoded and stored in RAM. As previously described, the array of connected and not-connected resistors R42 through R53 illustrated in FIG. 1B provides for the following functions: post-purge time period of 60 seconds, pre-purge time period of 30 seconds, a trial ignition time period of 4 seconds, a long warm-up time for igniter 66, extended retry, and monitoring of purge fan pressure switch 138.

After the above options have been determined, the program advances to a check of whether igniter 66 is de-energized. Specifically, pin AN0 is monitored. If the signal at pin AN0 is indicative of a current flow of less than 0.5 amperes through igniter 66, then igniter 66 is considered to be de-energized, as it should be, and the program advances to a check of whether there is a pre-purge. If the signal at pin AN0 is indicative of a current flow greater than 0.5 amperes through igniter 66, then igniter 66 is in an energized condition at a point in the program when it must be in a de-energized condition. If igniter 66 is in such energized condition, it is turned off by providing a constant low on pins P10 and P11, which low turns off transistor Q3. The program then jumps to the error program of FIG. 3, and LED 142 is activated to provide a steady-on signal indicative, as shown in FIG. 4, of a hardware fault. The hardware fault causing energizing of igniter 66 at this point in the program would be voltage regulator VR1 failing open or resistor R15 shorting.

The present system, by virtue of the connection of resistor R45 to pin P22, indicates there is to be a pre-purge of 30 seconds. The program therefore advances to providing a high at pin P12. This high causes a 6-second timer to be set, and a pre-purge timer to be set for 30 seconds. It is noted that this high at pin P12, which high is the signal at microcomputer M1 to effect the turn on of purge fan 30, does not initialize energizing of purge fan 30 since fan 30 is already energized due to thermostat 90 being on. This high does, however, initiate the 6-second and 30-second time periods.

Figure 2C:
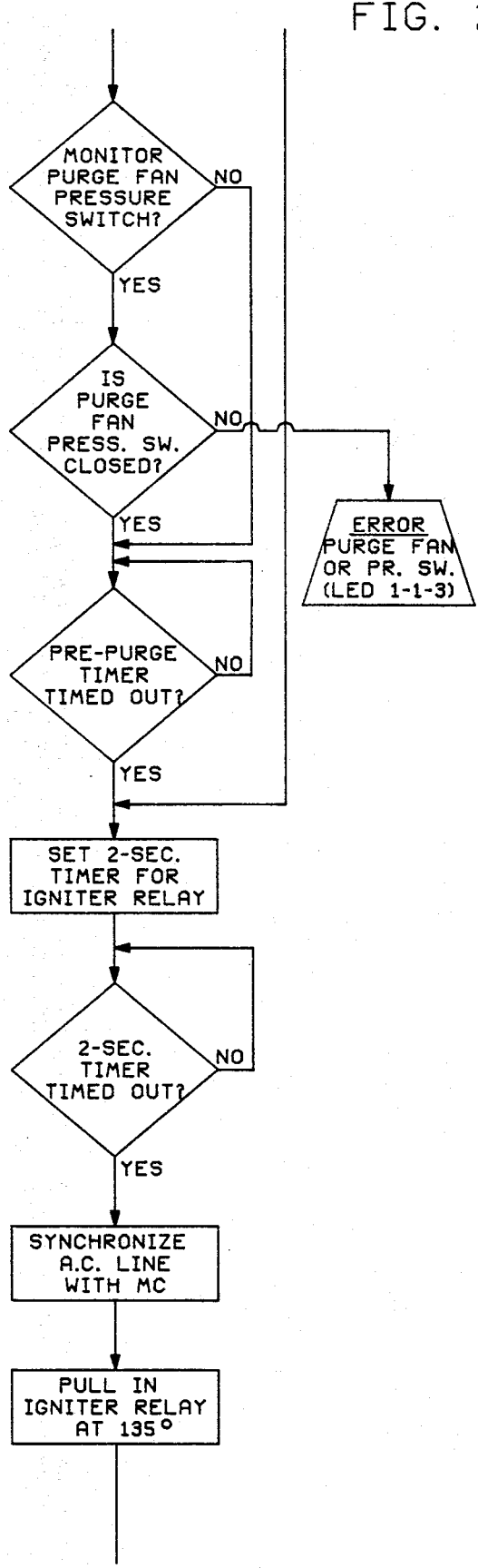

The 6-second timer provides adequate time for the purge fan 30 to achieve the speed necessary to effect closing of pressure switch 138. After the 6-second timer times out, the program advances, as shown in FIG. 2C, to a logic inquiry of whether the purge fan pressure switch 138 is to be monitored. The non-connection of resistor R48 to pin P26 indicates that monitoring is to be provided. Pin P05 of microcomputer M1 is checked. If pressure switch 138 is closed, a low appears at pin P05 and the program advances to a logic inquiry of whether the pre-purge timer is timed out. If pressure switch 138 is open, a high appears at pin P05 and the program jumps to the error program of FIG. 3. As shown in FIGS. 2C and 4, this error, which could be caused by a defective purge fan 30 or a failure of pressure switch 138 to close, results in an LED error code signal of 1-1-3.

After the pre-purge timer is timed out, a 2-second timer is set. During this 2-second time period, pins P10 and P11 go low and remain low, which turns off transistor Q3 in FIG. 1C so as to enable capacitor C9 to charge.

After the above 2-second timer is timed out, the program advances to functions of synchronizing the AC line with microcomputer M1 and effecting the energizing of igniter relay winding 80 at 135° in the AC sine wave. Specifically, pin T1 detects the zero cross-over points of the AC signal at transformer 10. A high-speed clock in microcomputer M1 is activated to produce high-speed pulses. The number of high-speed pulses between two consecutive zero cross-over points is counted, and the count is stored in memory. Also, this high-speed pulse count is multiplied by $\frac{3}{4}$ and the product is also stored in memory. The $\frac{3}{4}$ value represents the 135° point in the AC sine wave. In the program, when the pulse count reaches the $\frac{3}{4}$ value, pins P10 and P11 go high, turning on transistor Q3. With transistor Q3 on, relay winding 80 is energized, causing its controlled contacts 68 to close. The delay between the energizing of relay winding 80 and the closing of its contacts 68 is two milliseconds, so that energizing of relay winding 80 at 135° results in the closing of contacts 68 at approximately 180°, which is a zero cross-over point. It is to be noted that the closing of contacts 68 at or very near the zero cross-over point of the AC sine wave minimizes the electrical wear on contacts 68.

Figure 2D:
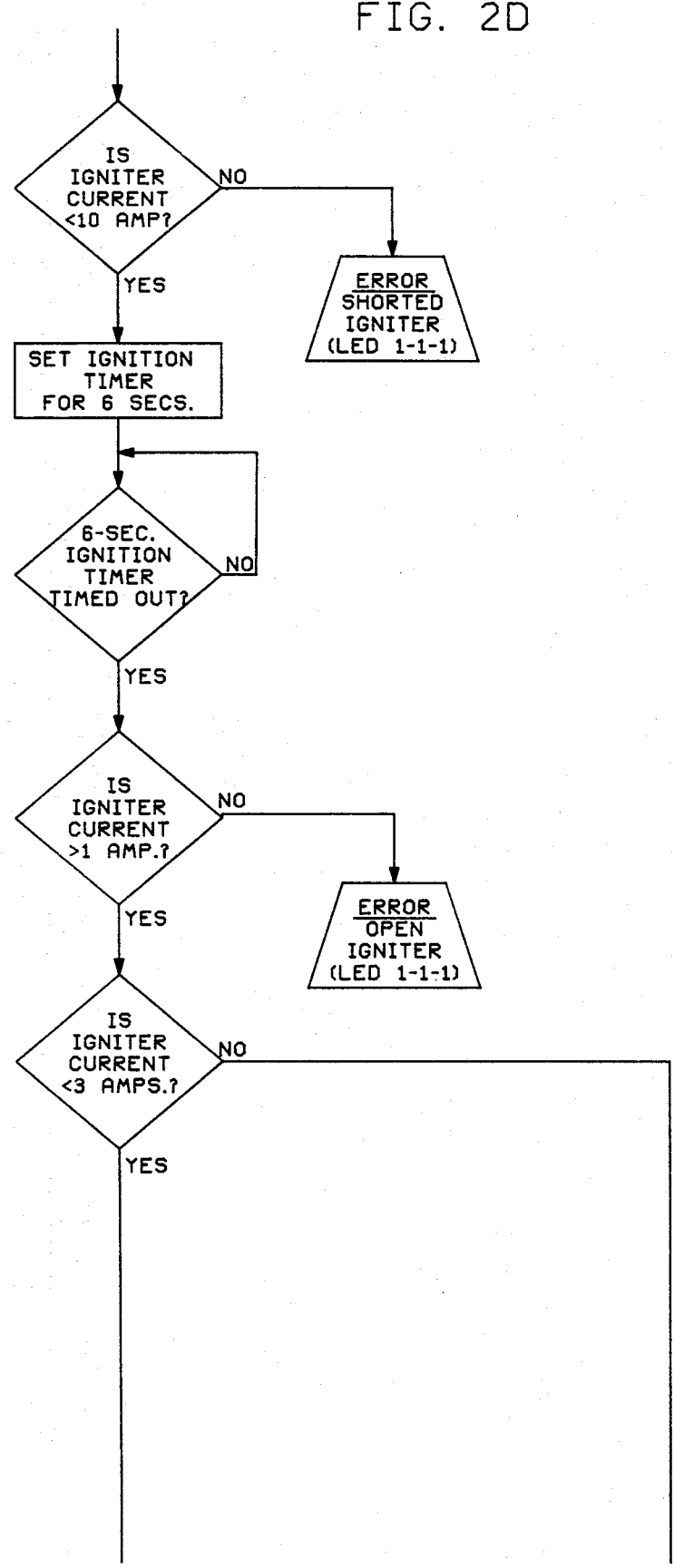

Referring to FIG. 2D, the program advances to a logic inquiry of whether the igniter current is less than 10 amperes. As previously described, igniter 66 typically draws approximately 1 ampere when cold, and approximately 5 amperes when heated to a temperature sufficiently high to ignite gas. Microcomputer M1 reads the value at pin AN0, which value is indicative of the value of the current flow through igniter 66. If the current flow is less than 10 amperes, as it should be, the program advances to the function of setting an ignition timer for 6 seconds. If the current flow is not less than 10 amperes, a condition which would result if igniter 66 were shorted, the program jumps to the error program of FIG. 3. As shown in FIGS. 2D and 4, this error of a shorted igniter is indicated by an LED error code signal of 1-1-1.

The 6-second ignition time allows igniter 66 to heat up. When the 6-second timer times out, the igniter current is checked to determine whether it is greater than 1 ampere. If the igniter current is greater than 1 ampere, as it should be after being heated for 6 seconds, the program advances to a logic inquiry as to whether the igniter current is less than 3 amperes. If the igniter current is not greater than 1 ampere, a condition indicative of an open circuit in igniter 66, the program jumps to the error program of FIG. 3. As shown in FIGS. 2D and 4, the error of an open circuited igniter is indicated by the LED error code signal of 1-1-1.

Figure 2E:
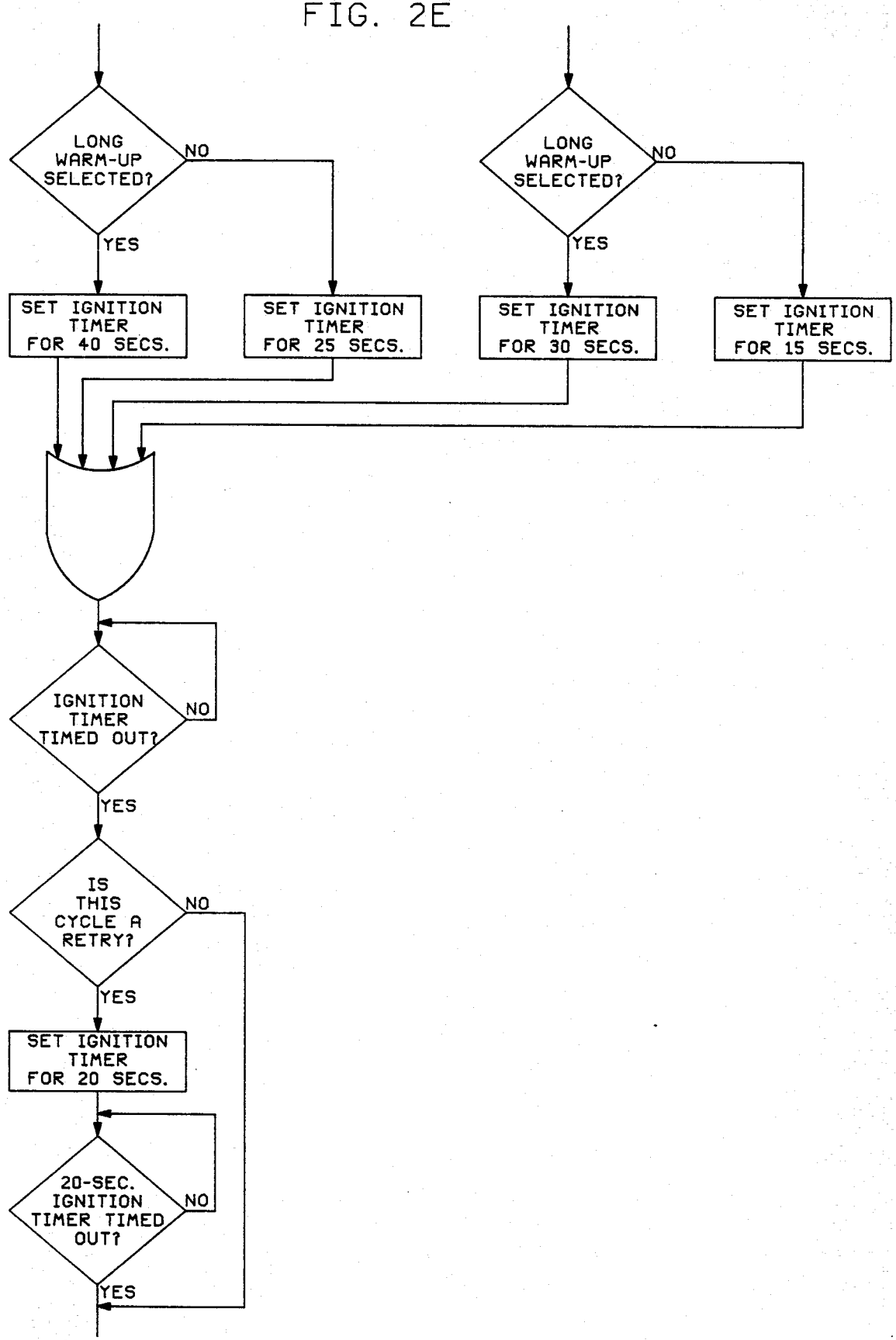

If the igniter current is less than 3 amperes, the program advances, as shown in FIG. 2E, to a logic inquiry of whether long warm-up is selected. The present system, by virtue of the connection of resistor R49 to pin P27, indicates that there is to be a long warm-up. An ignition timer is then set for 40 seconds. If resistor R49 were not connected, the ignition timer would be set for 25 seconds.

If the igniter current is greater than 3 amperes after the initial 6-second energizing period, the program also advances, as shown in FIG. 2E, to a logic inquiry of whether long warm-up is selected. However, as shown in FIG. 2E, in this program loop, when long warm-up is selected, the ignition timer is set for 30 seconds, and when long warm-up is not selected, the ignition timer is set for 15 seconds.

The above described logic inquiries as to whether the igniter current is less than 3 amperes and as to whether long warm-up is selected provide a desired feature of ensuring that the igniter 66 will attain gas ignition temperature and yet will not be subjected to unnecessary prolonged heating thereof, which prolonged heating would tend to reduce the igniter life. Specifically, the logic inquiry as to whether the igniter current is less than 3 amperes provides for varying the igniter energizing time period to compensate for line voltage variations, and the logic inquiry as to whether long warm-up is selected provides for varying the igniter energizing time period to compensate for igniters having different heating characteristics.

When the ignition timer times out, the program advances to the logic inquiry of whether this cycle is a retry. If a check on the retry counter in RAM (to be hereinafter described) indicates that this cycle is a retry, an ignition timer is set for 20 seconds and igniter 66 remains energized. This additional time for energizing igniter 66 is provided to compensate for any degregation of igniter 66, which degregation may be the cause of the retry.

Figure 2F:
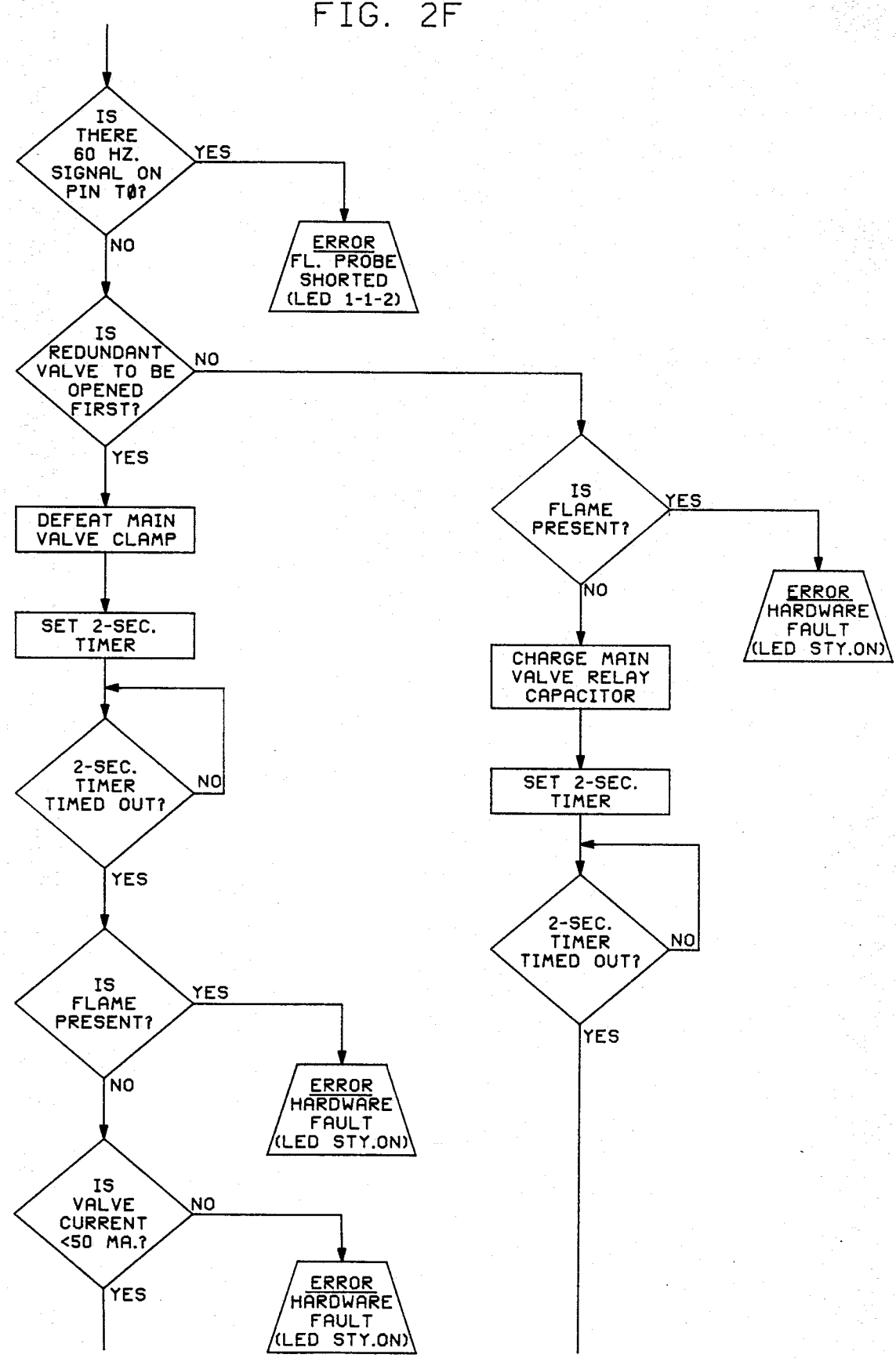

Referring to FIG. 2F, when the 20-second timer times out or if this cycle is not a retry, the program advances to a check of the signal on pin T∅. As previously described, in the absence of burner flame 52, pin T∅ is low, and, in the presence of burner flame 52, pin T∅ is high. If there is a 60 HZ signal on pin T∅, this condition indicates that flame probe 48 is shorted to burner 54. As shown in FIGS. 2F and 4, this error of a shorted flame probe is indicated by an LED error code signal of 1-1-2.

If the signal on pin T∅ is not 60 HZ, the program advances to the logic inquiry of whether the redundant valve 58 is to be opened first. This logic is achieved by checking a specific byte in RAM, which byte is complemented on each burner cycle so that, on alternate burner cycles, the order of opening redundant valve 58 and main valve 60 is reversed.

If redundant valve 58 is to be opened first, the main valve clamp circuit is defeated, which function comprises turning off transistor Q5 and turning on transistor Q4. A 2-second timer is then set. The 2-second time period, during which the main valve clamp circuit is defeated, is to determine if there are any malfunctions which might allow either the redundant valve 58 or main valve 60 to open.

When the 2-second timer is timed out, pin T∅ is checked to determine if the signal on pin T∅ is indicative of burner flame 52 being present. If the signal on pin T∅ so indicates, such indication is caused by transistor Q2 being shorted or leaky. As shown in FIGS. 2F and 4, this error is indicated by an LED error code signal of steady on.

Also when the 2-second timer is timed out, pin AN1, which is connected to junction 108 in FIG. 1B, is checked to determine if the valve current is less than 50 milliamperes. Since a typical current draw of redundant valve winding 96 is 400 miliamperes and that of main valve winding is 200 milliamperes, this program step is essentially intended to determine if either or both of the valve windings 96 and 98 are energized. Therefore, if the valve current is not less than 50 milliamperes, the system enters the error program. The fault could be a number of factors, such as a defective voltage regulator VR2, welded relay contacts 112, or a shorted SCR 100. As shown in FIGS. 2F and 4, this error is indicated by an LED error code signal of steady on.

Figure 2G:
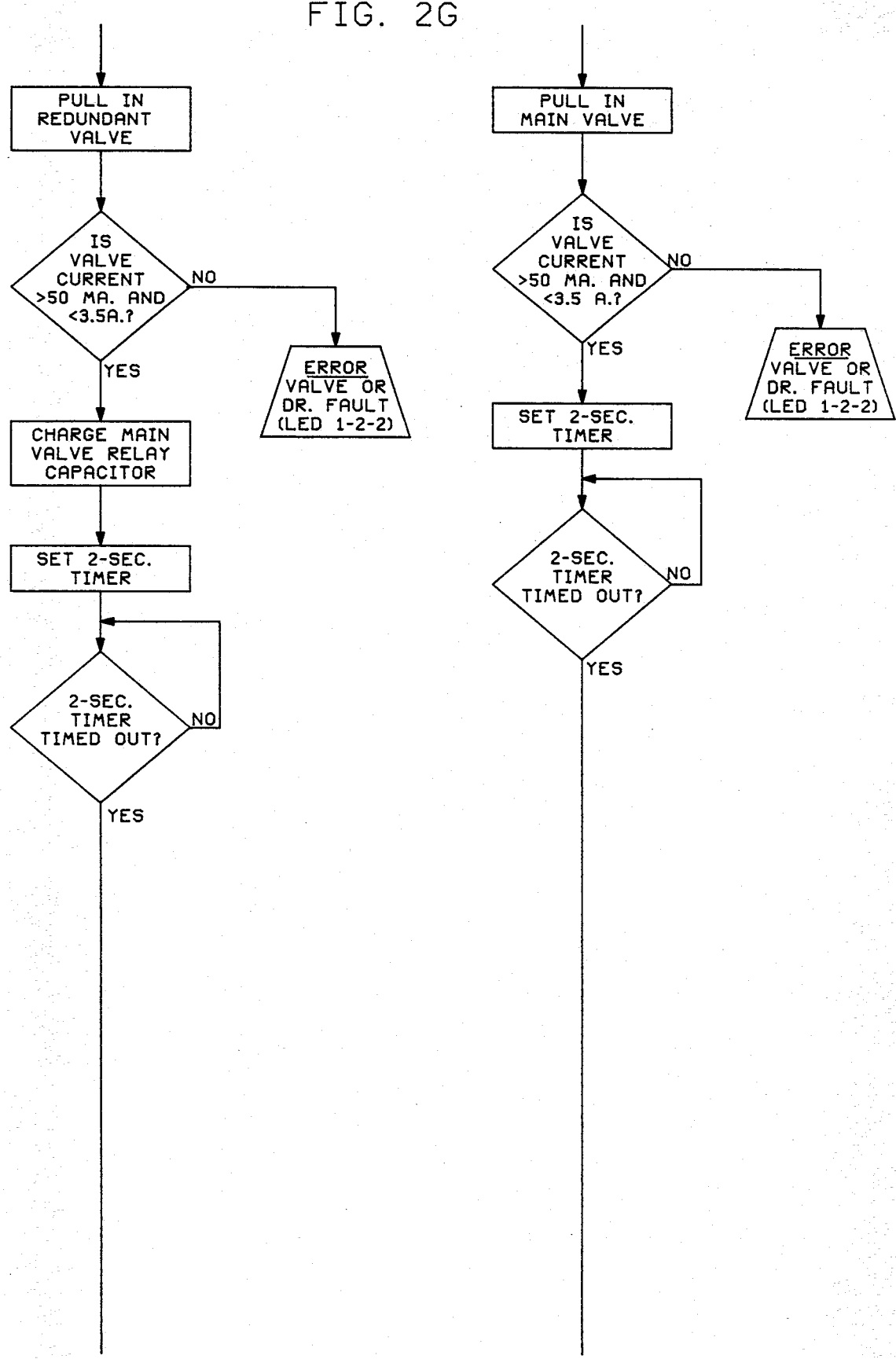

If valve current is less than 50 milliamperes, the program advances, as shown in FIG. 2G, to the step of pulling in redundant valve 58. Specifically, at this point in the program, microcomputer M1 provides the previously described 500 HZ signal at pin P15 to effect gating on of SCR 100. With SCR 100 on, redundant valve winding 96 is energized, causing redundant valve 58 to open.

The program then advances to determine if the valve current, as checked by pin AN1, is greater than 50 milliamperes and less than 3.5 amperes. If the valve current does not fall within these two values, the system enters the error program. This fault could be an open or shorted redundant valve winding 96, or a defective redundant valve driver circuit resulting in SCR 100 remaining off. As shown in FIGS. 2G and 4, this error is indicated by an LED error code signal of 1-2-2.

If the valve current is between 50 milliamperes and 3.5 amperes, microcomputer M1 stores the value of valve current and provides a constant high at pin P14 to effect turn-off of transistor Q4. With transistors Q4 and Q5 off, capacitor C15, which controls pull-in of relay winding 114, begins to charge. A 2-second timer is set to allow capacitor C15 to charge to the required pull-in value.

Figure 2H:
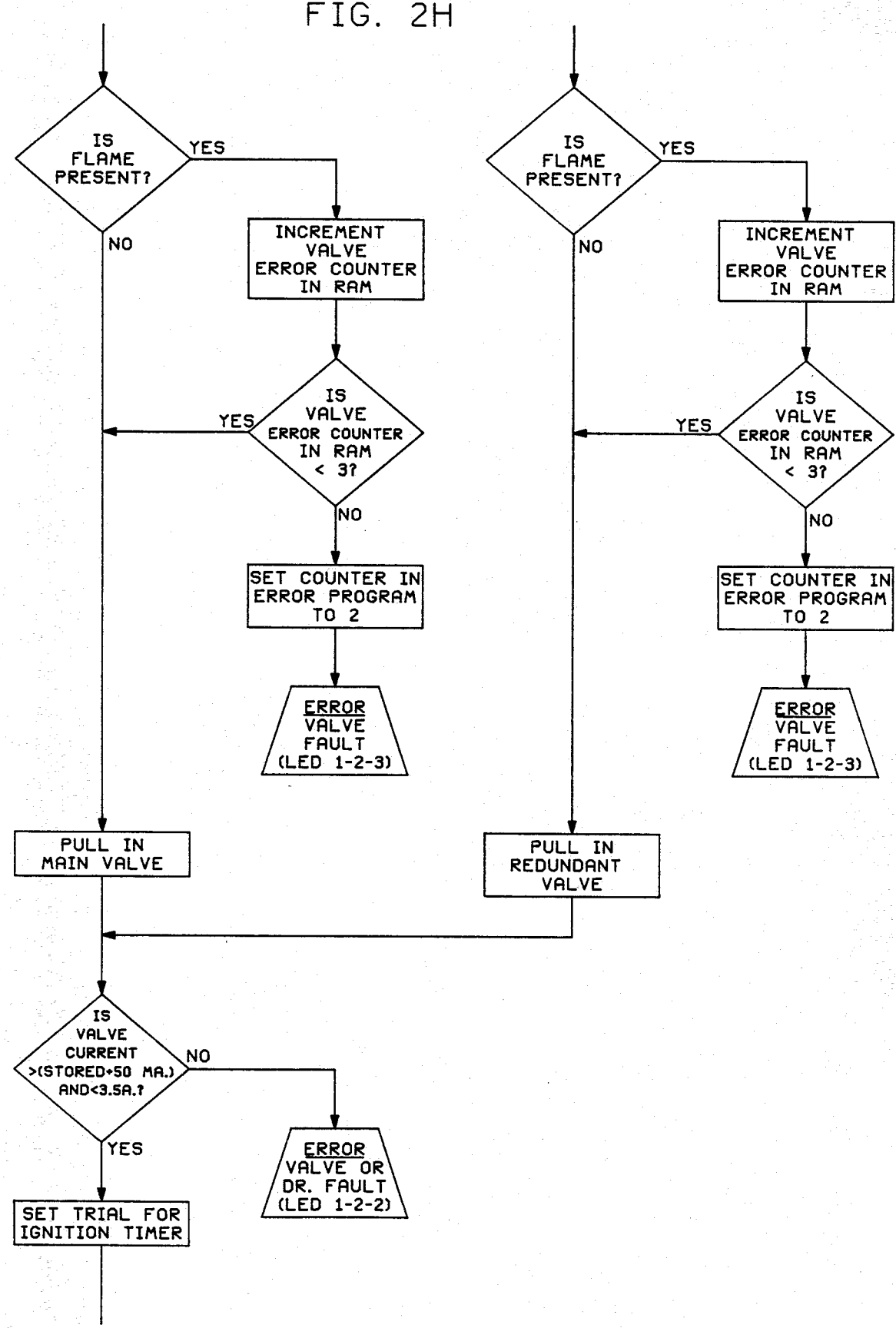

After the 2-second timer times out, the program advances, as shown in FIG. 2H, to a check on the presence of burner flame 52. Specifically, pin T∅ is checked. If pin T∅ detects a constant high, burner flame 52 is present; if pin T∅ detects a constant low, burner flame 52 is not present. If burner flame 52 is present, a valve error counter in RAM is incremented. If the valve error counter is less than 3, the program advances. If the valve error counter is 3, the counter in the error program of FIG. 3 is incremented to 2 and the system enters the error program. This fault is a leaky main valve 60. As shown in FIGS. 2H and 4, this error is indicated by an LED error code signal of 1-2-3. The valve leak could be caused, for example, by a piece of dirt on the seat of main valve 60 or by a mechanical sticking of a plunger or armature in valve 60. Because the cause of the valve leak may be transient or self-correcting, the program allows three such occurrences before entering the error program.

If burner flame 52 is not present, or if flame is present but the valve error counter in RAM is less than 3, the program advances to the function of pulling in main valve 60. Specifically, pin P14 provides a constant low to effect turn-on of transistor Q4, thus allowing capacitor C15 to discharge through relay winding 114. With relay winding 114 energized, its controlled contacts 112 close, effecting energizing of main valve winding 98.

As previously described, the order of opening redundant valve 58 and main valve 60 is reversed on alternate burner cycles. As can be seen in FIGS. 2F, 2G, and 2H, the program steps are similar when the main valve 60 is opened first. When the main valve 60 is opened first, it is noted that the main valve winding 98 is checked for an open or shorted condition, proper operation of the main valve driver circuit, which includes transistor Q4, is checked, and redundant valve 58 is checked for leaks.

After both redundant valve 58 and main valve 60 are opened, the program advances to a logic inquiry of whether the valve current is less than 3.5 amperes and greater than the sum of the previously stored value of valve current plus 50 milliamperes. The previously stored value is that of redundant valve winding 96 or main valve winding 98, depending on which valve winding was energized first in the present burner cycle. If the valve current at this point in the program is not greater than the stored value plus 50 milliamperes, one of the valve windings 96 and 98 are open or the controlling driver circuit failed; if the valve current is greater than 3.5 amperes, one of the valve windings 96 and 98 are shorted. For either fault, the system enters the error program. As shown in FIGS. 2H and 4, this error is indicated by an LED error code signal of 1-2-2.

If the valve current check shows that the valve current is within the defined limits, the program advances to the function of setting a timer for the trial ignition time period. Because resistors R46 and R47 are not connected, the selected trial ignition time period of the presently described program is 4 seconds.

Figure 2I:
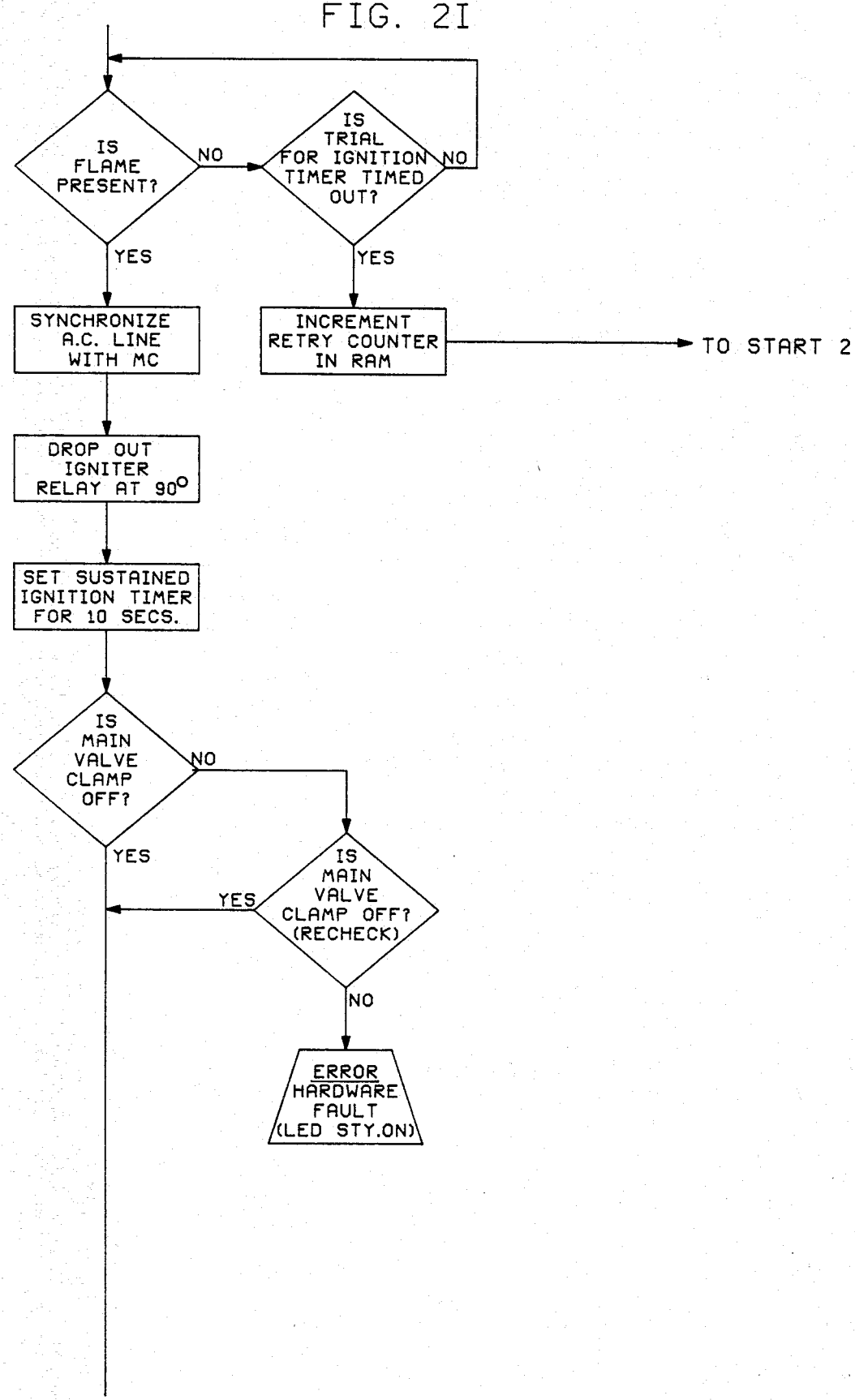

At this point in the system operation, igniter 66 is energized, and redundant valve 58 and main valve 60 are open, so that ignition should occur. As shown in FIG. 2I, the program advances to a logic inquiry of whether flame is present. If burner flame 52 does not appear in 4 seconds, a retry counter in RAM is incremented and the program returns to "START 2". It is noted that this retry counter is the counter described in conjunction with FIGS. 2A and 2E which is checked to determine how many tries have been made at ignition.

If ignition does occur within 4 seconds, pin T$\theta$ goes high due to the presence of burner flame 52 and the program advances to functions of synchronizing the AC line with microcomputer M1 and dropping-out igniter relay 80 at 90° in the AC sine wave. Specifically, pin T1 detects the zero cross-over point of the AC sine wave. The previously described high-speed clock in microcomputer M1 is activated. The number of high-speed pulses produced by the clock between two consecutive zero cross-overs is counted, and the count is stored in memory. Also, this pulse count is divided by 2 and the quotient, representing the 90° point in the AC sine wave, is also stored in memory. When the pulse count reaches the stored ½ value, pins P1$\theta$ and P11 go low, turning off transistor Q3. With transistor Q3 off, relay winding 80 is de-energized, causing its contacts 68 to open. The delay between the de-energizing of relay winding 80 and the opening of its contacts 68 is four milliseconds, so that de-energizing of relay winding 80 at 90° results in the opening of contacts 68 at approximately 180°, which is a zero cross-over point of the AC sine wave. The opening of contacts 68 at or very near the zero cross-over point minimizes the electrical wear on contacts 68.

A timer, designated as the sustained ignition timer, is then set for 10 seconds. Microcomputer M1 then checks the signal at pin P$\emptyset$6 to determine if the main valve clamp circuit is operating correctly. As previously described, the main valve clamping circuit is provided to prevent an unsafe condition from developing during lock-out. Specifically, transistor Q5 is off at this point in the program and the signal at pin P$\emptyset$6 must therefore be low. If the signal at pin P$\emptyset$6 is high, then microcomputer M1 or inverter 132 is malfunctioning. The program provides for a recheck of such condition and, if still occurring, provides for jumping into the error program. As shown in FIGS. 2I and 4, this error is indicated by an LED error code signal of steady on.

Referring to FIG. 2J, the program advances to a check of whether thermostat 90 is still on. If thermostat 90 is off, the retry counter in RAM is cleared and the program reverts back to "START 1". If thermostat 90 is on, the presence of burner flame 52 is checked until the 10-second sustained ignition timer times out. If burner flame 52 is lost during this 10-second time period and thermostat 90 is on, the retry counter in RAM is incremented and the program reverts back to "START 2". Thus, if flame is lost during the 10-second time period, such loss is considered in this program to be a failed attempt at ignition.

If burner flame 52 still exists after the 10-second sustained ignition timer times out, the attempt at ignition is considered successful. Accordingly, the program advances to the functions of clearing the retry counter in RAM and the counter in the error program. Also, microcomputer M1 provides for setting a specific byte in RAM to provide for a reverse order of valve opening on the next burner cycle.

Figure 2K:
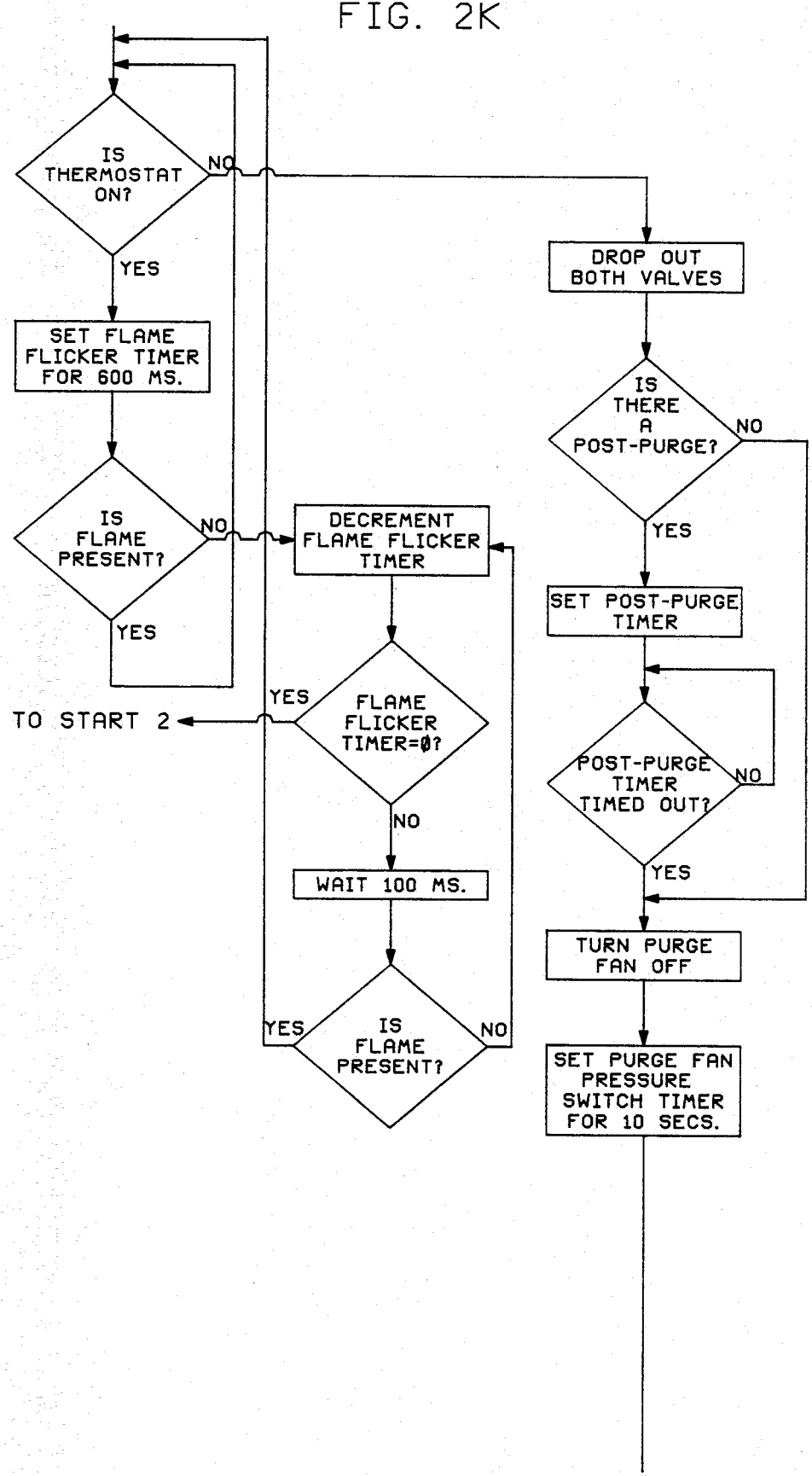

Referring to FIG. 2K, as long as thermostat 90 remains on beyond the 10-second sustained ignition time period, burner flame 52 is constantly monitored. Specifically, a flame flicker timer is set for 600 milliseconds. As previously described, capacitor C6 can maintain transistor Q2 conductive for approximately 80 milliseconds. Thus, should flame 52 fail to impinge flame probe 48 for a time period less than 80 milliseconds, transistor Q2 remains on and burner flame 52 is considered to be present. Should flame 52 fail to impinge probe 82 for a time period greater than 80 milliseconds, transistor Q2 turns off, and pin T$\emptyset$ detects a low. Microcomputer M1 then decrements the flame flicker timer. Monitoring of pin T$\emptyset$ occurs every 100 milliseconds. If the absence of flame continues to be indicated, the flame flicker timer is decremented every 100 milliseconds until it reaches zero. At that point, burner flame 52 has been indicated as being absent for 600 milliseconds and the system reverts back to "START 2". If burner flame 52 is indicated as being absent due to flame flicker for less than 600 milliseconds, the flame flicker timer is reset for 600 milliseconds and monitoring continues. It is noted that this method of monitoring burner flame 52 and providing for a re-attempt at ignition after a flame failure relies on the accurate timing inherent in microcomputer M1 rather than on the stability of components such as capacitor C6 and transistor Q2. Such method therefore can safely tolerate longer flame flicker time periods so as to prevent unnecessary recycling or possibly nuisance lock-out caused by flame flicker, and yet ensure that the system will automatically recycle when there is truly a flame failure.

As shown in FIG. 2K, when thermostat 90 is no longer on, microcomputer M1 provides a constant high at pin P15 to effect closing of redundant valve 58 and a constant high at pin P14 to effect closing of main valve 60. The program then advances to the logic inquiry of whether there is a post-purge. The connection of resistor R42 to pin P25 establishes that the present system is to have a post-purge function. The post-purge timer is then set. In the present system, the connection of resistor R43 to pin P24 establishes a post-purge time of 60 seconds. Thus, for 60 seconds, pin P12 will be maintained high to effect the continued conduction of transistor Q1. With transistor Q1 on, purge fan 30 will continue to run, purging the combustion chamber of products of combustion.

Figure 2L:
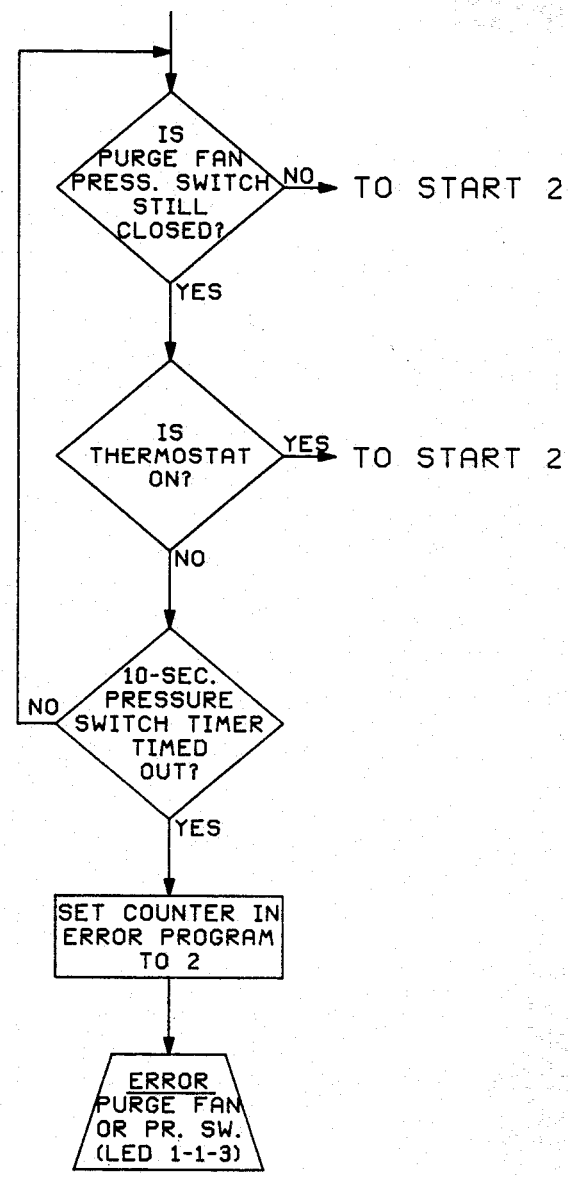

After the post-purge timer is timed out, pin P12 goes low to effect de-energizing of purge fan 30. A purge fan pressure switch timer is then set for 10 seconds. Referring to FIG. 2L, the purge fan pressure switch 138 is checked during this 10-second time period. If switch 138 opens, as it should, the system reverts back to "START 2". If the thermostat 90 turns back on during this 10-second time period, the system also reverts back to "START 2". If, however, the switch 138 remains closed and thermostat 90 remains off for the duration of this 10-second time period, the program advances to the function of setting the counter in the error program to 2 and the system enters the error program. As shown in FIGS. 2H and 4, this error, caused by a faulty purge fan 30 or pressure switch 138, is indicated by an LED error code signal of 1-1-3.

The following components have been found suitable for use in the system described herein.

| COMPONENT | TYPE |
| --- | --- |
| M1 | 8022 (Intel Corporation) |
| L1 | 100 Micro-henries |
| VR1, VR2 | IN4734A |
| Q1, Q3, Q4, Q5 | 2N5551 |
| Q2 | MPS6523 |
| CR1, CR2, CR3, CR5, CR7, CR9 through CR12, CR15, CR17 through CR19 | IN4004 |
| CR4, CR6, CR8, CR13, CR14, CR16, CR20 through CR22 | IN4150 |
| R1, R20, R25, R39 | 3.9k |
| R2 | 200 ohms |
| R3, R18, R22 | 1k |
| R4 | 12k |
| R5, R8, R9, R21, R38 | 1M |
| R6 | 130k |
| R7 | 270k |
| R10 | 3.9 M |
| R11 | 2.4k |
| R12 | 150 ohms |
| R13, R19, R41 | 2.2k |
| R14, R15, R28, R30, R40 | 10k |
| R16, R17, R31, R32 | 750 ohms |
| R23, R27 | 470 ohms |
| R24 | 1 ohm |
| R26, R35, R37 | 9.1 M |
| R29 | 240 ohms |
| R33 | 47 ohms |
| R34, R36 | 1.5k |

| COMPONENT | TYPE |
| --- | --- |
| R42 through R53 | 1.8k |
| C1 | 470 Mfd. |
| C2, C9, C15 | 22 Mfd. |
| C3, C8, C14 | 47 Mfd. |
| C4 | 2.2 Mfd. |
| C5, C10, C13 | .047 Mfd. |
| C6 | .022 Mfd. |
| C7 | 1 Mfd. |
| C11, C16, C17 | .0047 Mfd. |
| C12, C18, C20 | .001 Mfd. |
| C19 | .1 Mfd. |
| C21 | 30 Pfd. |

While the invention has been illustrated and described in detail in the drawings and foregoing description, it will be recognized that many changes and modifications will occur to those skilled in the art. For example, ignition means such as spark ignition could be used instead of an electrical resistance igniter. It is therefore intended, by the appended claims, to cover any such changes and modifications as fall within the true spirit and scope of the invention.

We claim:

1. In a gas burner control system,
a burner;
two electrically operated valves connected fluidically in series with said burner;
electrical resistance igniter for igniting said burner;
a programmable microcomputer;
circuit means connected to said microcomputer for enabling energizing of said igniter;
circuit means connected to said microcomputer for enabling a monitoring of the level of energizing of said igniter;
circuit means connected to said microcomputer for enabling sequential opening of said valves; and
circuit means connected to said microcomputer for enabling a monitoring of the presence and absence of a burner flame,
said circuit means for enabling energizing of said igniter including a transistor and a relay,
said relay having an electrical winding and a set of normally-open contacts,
said transistor being connected in series with said winding and the conduction thereof being controlled by said microcomputer,
said normally-open contacts being connected in series with said igniter,
said series-connected igniter and relay contacts being connected to a line voltage power source through electrical leads,
said circuit means connected to said microcomputer for enabling a monitoring of the level of energizing of said igniter including a resistor and a coil of wire connected in a closed electrical loop and circuit means connecting said microcomputer to the junction of said resistor and coil of wire,
said coil of wire being wrapped around one of said leads and having an induced current flow therein proportional to current flow through said igniter so that the voltage drop across said resistor is indicative of said level of energizing of said igniter.

2. In a gas burner control system,
a burner;
two electrically operated valves connected fluidically in series with said burner;
an electrical resistance igniter for igniting said burner;

a programmable microcomputer;

circuit means connected to said microcomputer for enabling energizing of said igniter;

circuit means connected to said microcomputer for enabling a monitoring of the level of energizing of said igniter;

circuit means connected to said microcomputer for enabling sequential opening of said valves; and circuit means connected to said microcomputer for enabling a monitoring of the presence and absence of a burner flame, said circuit means connected to said microcomputer for enabling sequential opening of said valves including a first electrical winding for controlling opening of one of said valves, a second electrical winding for controlling opening of the other of said valves, a relay having electrical winding and a set of normally-open contacts, said contacts being connected in series with said second electrical winding, a first valve driver circuit connected between said microcomputer and said first electrical winding for controlling energizing of said first electrical winding, a second valve driver circuit connected between said microcomputer and said relay winding for controlling energizing of said relay winding and thus said second electrical winding, said microcomputer being programmed to effect sequential energizing of said first and second valve driver circuits, said microcomputer being further programmed to reverse said sequential energizing of said first and second valve driver circuits on alternate burner cycles.

3. In a gas burner control system, a burner;

two electrically operated valves connected fluidically in series with said burner;

a first electrical winding for controlling opening of one of said valves;

a second electrical winding for controlling opening of the other of said valves;

a first relay including an electrical winding and a set of normally-open contacts, said normally-open contacts being connected in series with said second electrical winding;

a programmable microcomputer;

a first valve driver circuit connected between said microcomputer and said first electrical winding for controlling energizing of said first electrical winding;

a second valve driver circuit connected between said microcomputer and said first relay winding for controlling energizing of said first relay winding and thereby for controlling energizing of said second electrical winding;

an electrical resistance igniter for igniting said burner;

a second relay including an electrical winding and a set of normally-open contacts, said normally-open contacts being connected in series with said igniter;

circuit means connected between said microcomputer and said second relay winding for controlling energizing of said second relay winding and thereby for controlling energizing of said igniter;

isolating coupling circuit means connected between said microcomputer and said igniter for providing an input signal to said microcomputer indicative of the level of energizing of said igniter; and flame rectification circuit means connected to said microcomputer for providing an input signal thereto indicative of the presence or absence of a burner flame, said microcomputer being effective to sequentially effect energizing of said igniter, opening of said valves when said level of energizing of said igniter indicates that said igniter is capable of igniting gas, and, upon indication of said presence of a burner flame, de-energizing of said igniter and continued opening of said valves, said first valve driver circuit including an SCR and a gating circuit therefor, said second valve driver circuit including a transistor and a biasing circuit therefor, said first electrical winding being connected in series with said SCR and a resistor, said resistor being connected to the cathode of said SCR, said first relay winding being connected in series with the emitter-collector circuit of said transistor, said gating circuit and said biasing circuit being connected to said microcomputer, said second electrical winding being connected to the junction of said cathode of said SCR and said resistor, said junction being connected to said microcomputer, said microcomputer being effective to control energizing of said gating circuit and said biasing circuit and to monitor the voltage drop across said resistor so as to determine if none, one, or both of said first and second electrical windings are open, shorted, or energized.

4. The control system claimed in claim 3 wherein said igniter is connected to a line voltage power source through electrical leads, said isolating coupling circuit means includes a resistor and a coil of wire connected in a closed electrical loop, said coil of wire being wrapped around one of said leads and having an induced current flow therein proportional to current flow through said igniter, and said input signal to said microcomputer being proportional to voltage drop across said resistor.

5. The control system claimed in claim 4, wherein said microcomputer is programmable to vary a time period for energizing said igniter dependent upon the value of said voltage drop across said resistor so as to ensure that said igniter will attain a temperature sufficiently high to ignite gas.

6. In a gas burner control system, a burner;

two electrically operated valves connected fluidically in series with said burner, each of said valves having a controlling electrical winding;

an electrical resistance igniter for igniting said burner;

means for effecting energizing of said igniter;

means for monitoring the level of energizing of said igniter and for varying an igniter warm-up time period in response to said monitoring; and means for effecting sequential opening of said valves and for effecting a reverse order of said sequential opening on alternate burner cycles so as to determine if none, one, or both of said electrical windings are open, shorted, or energized.

7. The control system claimed in claim 6 further including means for selectively establishing a number of retries at ignition to be automatically made if a first attempt at ignition fails.

8. The control system claimed in claim 7 further including means for increasing said igniter warm-up time period during said retries at ignition.

9. The control system claimed in claim 6 further including a purge fan and means for selectively establishing durations of a pre-purge time period and a post-purge time period.

10. The control system claimed in claim 9 further including a purge fan pressure switch and means for monitoring whether said pressure switch is open or closed.

11. The control system claimed in claim 6 further including means for effecting a lock-out condition in the event of one of various system malfunctions, and means for visually indicating, by activation in a coded manner of a single light emitting means, which of said system malfunctions is causing said lock-out condition.

* * * * *